(12) United States Patent
Duchateau et al.

(10) Patent No.: US 10,519,267 B2
(45) Date of Patent: Dec. 31, 2019

(54) PROCESS FOR THE PREPARATION OF A GRAFT COPOLYMER COMPRISING A POLYOLEFIN MAIN CHAIN AND ONE OR A MULTIPLE POLYMER SIDE CHAINS AND THE PRODUCTS OBTAINED THEREFROM

(71) Applicant: SABIC GLOBAL TECHNOLOGIES B.V., Bergen op Zoom (NL)

(72) Inventors: Robbert Duchateau, Eindhoven (NL); Miloud Bouyahyi, Eindhoven (NL); Lidia Jasinska-Walc, Eindhoven (NL); Partha Pratim Goswami, Sittard (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 185 days.

(21) Appl. No.: 15/537,238

(22) PCT Filed: Dec. 17, 2015

(86) PCT No.: PCT/EP2015/080340
§ 371 (c)(1),
(2) Date: Jun. 16, 2017

(87) PCT Pub. No.: WO2016/097207
PCT Pub. Date: Jun. 23, 2016

(65) Prior Publication Data
US 2017/0320989 A1 Nov. 9, 2017

(30) Foreign Application Priority Data
Dec. 17, 2014 (EP) ..................................... 14198476

(51) Int. Cl.
*C08F 255/02* (2006.01)

(52) U.S. Cl.
CPC ................................. *C08F 255/02* (2013.01)

(58) Field of Classification Search
CPC .. C08F 4/65927; C08F 255/02; C08F 210/02; C08G 81/027; C08G 63/08
See application file for complete search history.

(56) References Cited

U.S. PATENT DOCUMENTS

| | | | |
|---|---|---|---|
| 4,414,132 A | 11/1983 | Goodall et al. | |
| 4,978,648 A | 12/1990 | Barbé et al. | |
| 5,077,357 A | 12/1991 | Job | |
| 5,106,806 A | 4/1992 | Job | |
| 5,556,820 A | 9/1996 | Funabashi et al. | |
| 6,583,237 B1 | 6/2003 | Imuta et al. | |
| 2003/0055179 A1 | 3/2003 | Ota et al. | |
| 2004/0122192 A1* | 6/2004 | Imuta .................... | C08F 210/00 526/127 |
| 2006/0287449 A1 | 12/2006 | Miyamoto et al. | |
| 2008/0234433 A1* | 9/2008 | Asandei ................ | C08F 265/04 525/74 |
| 2009/0048399 A1 | 2/2009 | Reijntjens et al. | |
| 2011/0028657 A1 | 2/2011 | Clark et al. | |
| 2011/0294960 A1 | 12/2011 | Hillmyer et al. | |
| 2014/0039138 A1 | 2/2014 | Giesbrecht et al. | |
| 2014/0039139 A1 | 2/2014 | Giesbrecht et al. | |
| 2014/0039140 A1 | 2/2014 | Giesbrecht et al. | |
| 2014/0200313 A1 | 7/2014 | Chenal et al. | |
| 2014/0350200 A1 | 11/2014 | Batinas-Geurts et al. | |
| 2017/0320987 A1 | 11/2017 | Bouyahyi et al. | |
| 2017/0320988 A1 | 11/2017 | Jasinska-Walc et al. | |
| 2017/0349710 A1 | 12/2017 | Jaskinska-Walc et al. | |

FOREIGN PATENT DOCUMENTS

| | | |
|---|---|---|
| EP | 1186619 A2 | 3/2002 |
| EP | 1283222 A1 | 2/2003 |
| JP | 2001288272 A | 10/2001 |
| WO | 9319104 A1 | 9/1993 |
| WO | 9613529 A1 | 5/1996 |
| WO | 9632427 A1 | 10/1996 |
| WO | 9742232 A1 | 11/1997 |
| WO | 9742236 A1 | 11/1997 |
| WO | 0069921 A1 | 11/2000 |
| WO | 0123441 A1 | 4/2001 |
| WO | 2007134851 A1 | 11/2007 |

(Continued)

OTHER PUBLICATIONS

Kashiwa et al. Journal of Polymer Science: Part A: Polymer Chemistry, vol. 41, 3657-3666 (Year: 2003).*
Amgoune et al., "Controlled ring-opening polymerization of lactide by group 3 metal complexes," Pure Appl. Chem., vol. 79, No. 11, pp. 2013-2030 (2007).
Amgoune et al., "Highly Active, Productive, and Syndiospecific Yttrium Initiators for the Polymerization of Racemic B-Butyrolactone," Angew. Chem. Int. Ed. 2006, 45, 2782-2784.
Amgoune et al., "Ring-Opening Polymerization of Lactide with Group 3 Metal Complexes Supported by Dianionic Alkoxy-Amino-Bisphenolate Ligands: Combining High Activity, Productivity, and Selectivity," Chem. Eur. J. 2006, 12, 169-179.
Becquart et al., "Poly[ethylene-co-(vinyl alcohol)]-graft-poly(ε-caprolactone) Synthesis by Reactive Extrusion, 1-Structrual and Kinetic Study(a)," Macromol. Mater. Eng. 2009, 294, 643-650.
Bourissou et al., "Recent advances in the controlled preparation of poly(a-hydroxy acids): Metal-free catalysts and new monomers," C.R. Chimie 10 (2007) 775-794.

(Continued)

Primary Examiner — Mark S Kaucher
(74) Attorney, Agent, or Firm — Cantor Colburn LLP

(57) ABSTRACT

The present invention relates to a cascade process for the preparation of a graft copolymer comprising a polyolefin main chain and one or a multiple polymer side chains. The process comprising step A) of copolymerizing at least one first type of olefin monomer and at least one second type of metal-pacified functionalized olefin monomer using a catalyst system to obtain a polyolefin main chain having one or multiple metal-pacified functionalized short chain branches, the catalyst system comprising: i) a metal catalyst or metal catalyst precursor comprising a metal from Group 3-10 of the IUPAC Periodic Table of elements; and ii) optionally a co-catalyst; and step B) of forming one or multiple polymer side chains on the polyolefin main chain having one or multiple metal-pacified functionalized short chain branches to obtain the graft copolymer.

15 Claims, No Drawings

(56) References Cited

FOREIGN PATENT DOCUMENTS

| WO | 2011014533 A1 | 2/2011 |
| WO | 2011112897 A1 | 9/2011 |

OTHER PUBLICATIONS

Cai et al., "Stereoselective ring-opening polymerization of racemic lactide using alkoxy-amino-bis(phenolate) group 3 metal complexes," Royal Society of Chemistry 2004, Chem. Commun., 2004, 330-331.

Chamberlain et al., "Polymerization of Lactide with Zinc and Magnesium B-Diiminate Complexes: Stereocontrol and Mechanism," J. Am. Chem. Soc. 2001, 123, 3229-3238.

Chen et al., "Cocatalysts for Metal-Catalyzed Olefin Polymerization: Activators, Activation Processes, and Structure-Activity Relationships," Chem. Rev. 2000, 100, pp. 1391-1434.

Cheng et al., "Single-Site Catalysts for Ring-Opening Polymerization: Synthesis of Heterotactic Poly(lactic acid) from rac-Lactide," J. Am. Chem. Soc. 1999, 121, 11583-11584.

Choi et al., Recent Developments in Transition Metal Catalyzed Olefin Polymerization—A Survey. I. Ethylene Polymerization; JMS Review Macromolecular Chemical Physics C25(I), 1-55 (1985).

Dechy-Cabaret et al., "Controlled Ring-Opening Polymerization of Lactide and Glycolide," Chem. Rev. 2004, 104, 6147-6176.

Descour et al., "In situ compatibilisation of alkenyl-terminated polymer blends using cross metathesis," RSC Adv., 2015, 5, pp. 9658-9666.

Ferreira et al., "Tin-Catalyzed Esterification and Transesterification Reactions: A Review," International Scholarly Research Network, 2012, 13 Pages.

Han et al., "Synthesis of Hydroxy-Terminated Polyethylene via Controlled Chain Transfer Reaction and Poly(ethylene-b-caprolactone) Block Copolymer," Macromolecules 2002, 35, pp. 8923-8925.

Helwani et al., "Solid heterogeneous catalysts for transesterification of triglycerides with methanol: A review," Applied Catalysis A: General 363 (2009) 1-10.

International Search Report for International Application No. PCT/EP2015/080340; International Filing Date: Dec. 17, 2015; dated Mar. 2, 2016; 6 Pages.

Kamber et al., "Organocatalytic Ring-Opening Polymerization," Chem. Rev. 2007, 107, 5813-5840.

Kotzabasakis et al., "Synthesis and Characterization of Complex Macromolecular Architectures Based on Poly(a-olefins) Utilizing a Cs-Symmetry Hafnium Metallocene Catalyst in Combination with Atom Transfer Radical Polymerization (ATRP)," Macromolecules 2011, 44, 1952-1968.

Kricheldorf, "Syntheses of Biodegradable and Biocompatible Polymers by Means of Bismuth Catalysts," Chem. Rev. 2009, 109, 5579-5594.

Labourdette et al., "Unusually Stable Chiral Ethyl Zinc Complexes: Reactivity and Polymerization of Lactide," Organometallics 2009, 28, 1309-1319.

Lee et al., "Heterogeneous Base Catalysts for Transesterification in Biodiesel Synthesis," Catal. Surv. Asia (2009) 13:63-77.

Lou et al., "Novel Aliphatic Polyesters Based on Functional Cyclic (Di)Esters," Macromol. Rapid Commun. 2003, 24, 161-172.

Lu et al., "Syntheses of diblock copolymers polyolefin-b-poly(ε-caprolactone) and their applications as the polymeric compatilizer," Polymer 46 (2005) 10585-10591.

Machine Translation of JP2001288272A; Date of Publication: Oct. 16, 2001; 33 Pages.

Makio et al., "Synthesis of Telechelic Olefin Polymers via Catalyzed Chain Growth on Multinuclear Alkylene Zinc Compounds," J. Am. Chem. Soc; 2013, pp. 8177-8180, vol. 135.

Martinez et al., "Ring-opening metathesis polymerization of 8-membered cyclic olefins," Polym. Chem., 2014, 5, pp. 3507-3532.

Nakano et al., "Metal-catalyzed synthesis of steroregular polyketones, polyesters, and polycarbonates," The Royal Society of Chemistry 2003, Dalton Trans., 2003, 4039-4050.

Nomura et al., "Stereoselective Ring-Opening Polymerization of a Racemic Lactide by Using Achiral Salen- and Homosalen-Aluminum Complexes," Chem. Eur. J. 2007, 13, 4433-4451.

O'Keefe et al., "Polymerization of lactide and related cyclic esters by discrete metal complexes," J. Chem. Soc., Dalton Trans., 2001, 2215-2224.

Otera et al., "Esterification: Methods, Reactions, and Applications," Wiley-VCH (2010) 54 Pages.

Otera, "Transesterification," Chem. Rev. 1993, 93, pp. 1449-1470.

Ovitt et al., "Stereochemistry of Lactide Polymerization with Chiral Catalysts: New Opportunities for Stereocontrol Using Polymer Exchange Mechanisms," J. Am. Chem. Soc. vol. 124, No. 7, 2002, pp. 1316-1326.

Ovitt et al., "Stereoselective Ring-Opening Polymerization of meso-Lactide: Synthesis of Syndiotactic Poly(lactic acid)," J. Am. Chem. Soc. 1999, 121, 4072-4073.

Pullukat & Hoff, "Silica-Based Ziegler-Natta Catalysts: A Patent Review," Catal. Rev.—Sci. Eng., 41(3&4), pp. 389-428 (1999).

Qi-Zheng Li et al., "Well-Defined Polyolefin/Poly(ε-caprolactone) Diblock Copolymers: New Synthetic Strategy and Application," Journal of Polymer Science: Part A: Polymer Chemistry, pp. 511-517.

Spassky et al., "Highly steroelective polymerization of rac-(D,L)-lactide with a chiral Schiff's base/aluminum alkozide initiator," Macromol. Chem. Phys. 197, 2627-2637 (1996).

Williams et al., "A Highly Active Zinc Catalyst for the Controlled Polymerization of Lactide," J. Am. Chem. Soc., vol. 125, No. 37, 2003, 11350-11359.

Written Opinion of the International Searching Authority for International Application No. PCT/EP2015/080340; International Filing Date: Dec. 17, 2015; dated Mar. 2, 2016; 7 Pages.

Wu et al., "Recent developments in main group metal complexes catalyzed/initiated polymerization of lactides and related cyclic esters," Coordination Chemistry Reviews 250 (2006) 602-626.

Zhao et al., "Synthesis of well-defined amphiphilic branched polyethylene-graft-poly (N-isopropylacrylamide) copolymers by coordination copolymerization in tandem with RAFT polymerization and their selfassembled vesicles," Polym. Chem., 2014, 5, 962-970.

Zheng et al., "Zinc and enolato-magnesium complexes based on bi-, tri- and tetradentate aminophenolate ligands," New J. Chem., 2008, 32, 2279-2291.

Zhu et al., "Group 13 and Lanthanide Complexes Supported by Tridentate Tripodal Triamine Ligands: Structural Diversity and Polymerization Catalysis," Organometallics 2007, 26, 5395-5405.

Horng et al., "Synthesis of Diblock Polyolefin and Polyester Copolymers Via Hafnium and Stannous Octoate Catalysts," Polymer Preprints, 1996, pp. 639-640, vol. 38, Issue 1.

\* cited by examiner

PROCESS FOR THE PREPARATION OF A GRAFT COPOLYMER COMPRISING A POLYOLEFIN MAIN CHAIN AND ONE OR A MULTIPLE POLYMER SIDE CHAINS AND THE PRODUCTS OBTAINED THEREFROM

CROSS REFERENCE TO RELATED APPLICATIONS

This application is a 371 of International Application No. PCT/EP2015/080340, filed Dec. 17, 2015, which claims priority to European Application No. 14198476.5, filed Dec. 17, 2014 which are incorporated herein by reference in their entirety.

The present invention relates to a process for the preparation of a graft copolymer comprising a polyolefin main chain and one or a multiple polymer side chains using a cascade-like process and the products obtained therefrom.

BACKGROUND

The present invention relates to a process for preparing graft copolymers having a polyolefin main chain containing one or multiple polar or nonpolar side chains and the products obtained therefrom.

Graft copolymers combining a polyolefin main chain with at least one nonpolar polyethylene-like polymer side chain are useful as compatibilizers for e.g. polyolefin (e.g. iPP) and polyethylene blends. The preparation of actual polyolefin-polyethylene graft copolymers (e.g. iPP-g-PE) is a very tedious process.

Graft copolymers combining a polyolefin main chain with at least one type of polar polymer side chain may be used to enhance the properties of polyolefin polymers that have an inherent nonpolar character that leads to drawbacks for certain applications, because of poor adhesion, printability and compatibility that can restrict their efficacy. Furthermore, such graft copolymers are useful as compatibilizers for e.g. polyolefin (e.g. iPP) and polar polymers (e.g. polycarbonate) blends.

It is known that craft copolymers may be prepared using as a main chain a well-defined randomly functionalized polyolefin, containing functionalized short chain branches. This main chain polyolefin is prepared in a separate process to which the side chains are added using an additional catalyst in a subsequent process.

Other, related prior art (Becquart, Macromol. Mater. Eng. 2009, 294, 643-650) uses a process where poly(ethylene-co-vinyl alcohol) (EVOH) is applied as a poly(hydroxyl) functionalized polyethylene and treated with a polyester in the presence of $SnOct_2$ as transesterification catalyst to form the corresponding EVOH-graft-polyester graft copolymers.

The formation of the polar or nonpolar polymer side chains can either be carried out by growing these polymer side chains from the reactive substituents on the polyolefin main chain (grafting from approach) or by attaching a pre-synthesized polymer to the reactive side groups of a polyolefin main chain (grafting onto approach).

The aim of the present invention is to provide an easy, versatile and tunable process for the preparation of graft copolymers.

It is moreover an aim of the present invention to produce graft copolymers having a polyolefin main chain and at least one type of polar or nonpolar (preferably polyethylene-like polyester) polymer side chains.

It is moreover an aim of the present invention to provide copolymers that can be used as compatibilizers for blends of polyolefins and polar polymers, such as iPP with polycarbonate, or for blends of polyolefins and nonpolar polymers, such as iPP with PE.

One or more of these aims are obtained by the process according to the present invention.

SUMMARY OF THE INVENTION

The present invention relates to the novel and inventive cascade-like process for the preparation of graft copolymers comprising a polyolefin main chain and one or a multiple polymer side chains and the products obtained therefrom.

In a first aspect, the present invention relates to a process for the preparation of a graft copolymer comprising a polyolefin main chain and one or a multiple polymer side chains, the process comprising the steps of:

A) copolymerizing at least one first type of olefin monomer and at least one second type of metal-pacified functionalized olefin monomer using a catalyst system to obtain a polyolefin main chain having one or multiple metal-pacified functionalized short chain branches, the catalyst system comprising:
   i) a metal catalyst or metal catalyst precursor comprising a metal from Group 3-10 of the IUPAC Periodic Table of elements; and
   ii) optionally a co-catalyst;
B) forming one or multiple polymer side chains on the polyolefin main chain, wherein as catalytic initiators the metal-pacified functionalized short chain branches on the polyolefin main chain obtained in step A) are used to obtain the graft copolymer.

In an embodiment, the catalyst system further comprises:
iii) optionally a scavenger.

Step B) may be carried out for example by ring opening polymerization (ROP) and/or nucleophilic substitution.

In an embodiment, step B) of obtaining a graft copolymer may be carried out by a ring-opening polymerization (ROP) using at least one type of cyclic monomer.

In an embodiment, step B) of obtaining a graft copolymer may be carried out by a nucleophilic substitution reaction, especially for example transesterification, at a carbonyl group-containing functionality, especially for example a carboxylic or carbonic acid ester functionality, of at least one polymer for the side chains.

In an embodiment, the first type of olefin monomer is a compound according to Formula I-A:

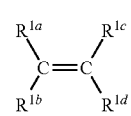

Formula I-A wherein C is carbon and wherein $R^{1a}$, $R^{1b}$, $R^{1c}$, and $R^{1d}$ are each independently selected from the group consisting of H or hydrocarbyl with 1 to 16 carbon atoms.

In another embodiment, the second type of metal-pacified functionalized olefin monomer is a compound according to Formula I-B:

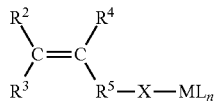

Formula I-B wherein C is carbon;
wherein $R^2$, $R^3$, and $R^4$ are each independently selected from the group consisting of H or hydrocarbyl with 1 to 16 carbon atoms, and
wherein $R^5X-ML_n$ is a main group metal pacified heteroatom-containing functional group, wherein X is a heteroatom or a heteroatom-containing functional group, wherein the heteroatom that is bonded to M is selected from the group consisting of O, S and N; wherein $R^5$ is a hydrocarbyl with 1 to 16 carbon atoms.

In yet another embodiment, step B) is carried out directly after step A), preferably in a series of connected reactors, preferably continuously.

In yet another embodiment, during step B) no additional catalyst beside the catalytic initiator for the ROP or nucleophilic substitution reaction is added.

In yet another embodiment, the metal catalyst or metal catalyst precursor used in step A) comprises a metal from Group 3-8, preferably Group 3-6, more preferably from Group 3-4 of the IUPAC Periodic Table of elements.

In yet another embodiment, the metal catalyst or metal catalyst precursor used in step A) comprises a metal selected from the group consisting of Ti, Zr, Hf, V, Cr, Fe, Co, Ni, Pd, preferably Ti, Zr or Hf.

In an embodiment, said catalyst can be a Ziegler-Natta catalyst, such as for example titanium-magnesium and aluminum based Ziegler-Natta catalysts, especially obtained for example by reacting a titanium alkoxy with a magnesium alkoxy and subsequently reaction the reaction product with an aluminum alkyl halide, or a catalyst based on a Group 4 metal, which can especially be for example a metallocene, half-metallocene or a post-metallocene and/or a single-site catalyst.

In an embodiment, a catalyst precursor can be for example a $C_s$-, $C_1$- or $C_2$-symmetric zirconium or hafnium metallocene, preferably an indenyl substituted zirconium or hafnium dihalide, more preferably a bridged bis-indenyl zirconium or hafnium dihalide, even more preferably rac-dimethyl silyl bis-indenyl zirconium or hafnium dichloride (rac-Me$_2$Si(Ind)$_2$ZrCl$_2$ and rac-Me$_2$Si(Ind)$_2$HfCl$_2$, respectively), or rac-dimethylsilyl bis-(2-methyl-4-phenyl-indenyl) zirconium or hafnium dichloride (rac-Me$_2$Si(2-Me-4-Ph-Ind)$_2$ZrCl$_2$ and rac-Me$_2$Si(2-Me-4-Ph-Ind)$_2$HfCl$_2$, respectively).

In an embodiment, said catalyst precursor can be for example a so-called half-metallocene, or constrained geometry catalyst, even more preferably, $C_5Me_5[(C_6H_{11})_3P=N]TiCl_2$, [Me$_2$Si(C$_5$Me$_4$)N(tBu)]TiCl$_2$, [C$_5$Me$_4$(CH$_2$CH$_2$NMe$_2$)]TiCl$_2$.

In an embodiment, said catalyst can be for example a so-called post-metallocene, preferably [Et$_2$NC(N(2,6-iPr$_2$—C$_6$H$_3$)]TiCl$_3$ or [N-(2,6-di(1-methylethyl)phenyl)amido)(2-isopropylphenyl)(α-naphthalen-2-diyl(6-pyridin-2-diyl)methane)]hafnium dimethyl.

In yet another embodiment, the co-catalyst is selected from the group consisting of aluminum alkyls and aluminum alkyl halides, such as for example triethyl aluminum (TEA) or diethyl aluminum chloride (DEAC), or MAO, DMAO, MMAO, SMAO and fluorinated aryl borane or fluorinated aryl borate.

In yet another embodiment, the scavenger is selected from the group consisting of aluminum alkyls, such as tri(i-butyl) aluminum, trioctyl aluminum, trimethyl aluminum, MAO, MMAO, SMAO, zinc alkyls, such as diethyl zinc, or magnesium alkyls such as dibutyl magnesium. In an embodiment, the scavenger is the same compound as the co-catalyst. In another embodiment, the scavenger is a different compound than the co-catalyst. The scavenger may also function as a chain transfer agent.

In yet another embodiment, the olefin monomer according to Formula I-A is selected from the group consisting of ethylene, propylene, 1-butene, 4-methyl-1-pentene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-cyclopentene, cyclohexene, norbornene, ethylidene-norbornene, and vinylidene-norbornene and one or more combinations thereof.

In yet another embodiment, the cyclic monomer used during ROP in step B) to produce the graft copolymer is a polar monomer, selected from the group consisting of a lactone, a lactide, a cyclic oligoester (e.g. a di-ester, a tri-ester, a tetra-ester, a penta-ester or higher oligoesters), an epoxide, an aziridine, a combination of epoxide and/or aziridine and $CO_2$, a cyclic anhydride, a combination of epoxide and/or aziridine and a cyclic anhydride, a combination of epoxide and/or aziridine and $CO_2$ and a cyclic anhydride, a cyclic N-carboxyanhydride, a cyclic carbonate, a lactam and one or more combinations thereof.

In yet another embodiment, the cyclic monomer used during ROP in step B) is a cyclic monomer comprising a carbonyl group-containing functionality and at least 10 consecutive carbon atoms in the ring/cycle, preferably selected from the group consisting of cyclic esters such as macrolactones, cyclic carbonates, cyclic amides, cyclic urethanes and cyclic ureas; or one or more combinations thereof, preferably macrolactones.

In yet another embodiment, the polymer for the side chains comprising at least a carboxylic or carbonic acid ester functionality or a carbonyl group-containing functionality is selected from the group consisting of a polyester, a polycarbonate, a polyamide, a polyurethane, a polyurea, a random or block poly(carbonate-ester), poly(carbonate-ether), poly(ester-ether), poly(carbonate-ether-ester), poly(ester-amide), poly(ester-ether-amide), poly(carbonate-amide), poly(carbonate-ether-amide), poly(ester-urethane), poly(ester-ether-urethane), poly(carbonate-urethane), poly(carbonate-ether-urethane), poly(ester-urea), poly(ester-ether-urea), poly(carbonate-urea), poly(carbonate-ether-urea), poly(ether-amide), poly(amide-urethane), poly(amide-urea), poly(urethane-urea) or one or more combination thereof.

In yet another embodiment, the pacifying metal used to obtain the metal-pacified functionalized olefin monomer is selected from the group consisting of: magnesium, calcium, boron, aluminum, gallium, bismuth, titanium, zinc, and one or more combinations thereof.

In an embodiment, in the process does not include the presence of a polymer-OH intermediate.

In another aspect of the present invention, the invention relates to a graft copolymer obtained by or obtainable by a process according to the present invention.

Definitions

The following definitions are used in the present description and claims to define the stated subject matter. Other terms not cited below are meant to have the generally accepted meaning in the field.

"graft copolymer" as used in the present description means: a macromolecule with one or more side chains connected to the main chain. These side chains have constitutional or configurational features that differ from those in the main chain.

"main chain" as used in the present description means: the linear polymer chain to which all other chains may be regarded as being pendant. The main chain is preferably also the polymer chain starting from which other chains/side chains may be obtained. The main chain is thus obtained in step A).

"side chain" or "branch" or "polymer branches" or "polymer side chains" as used in the present description means: an offshoot from a polymer main chain. These terms can be used interchangeably. This offshoot may be oligomer or polymeric and might be similar or different in nature compared to the polymer main chain. A "side chain" or "branch" or "polymer branches" or "polymer side chains" can thereby also be a random or block copolymer comprising at least two different monomers. "Side-chains" can be obtained staring from the main chain. "Side-chains" can thereby be obtained in step B).

"short chain branch" as used in the present description means: a branch that has only a few atoms. Short chain branches are much smaller than the backbone of the linear molecule to which they are attached.

"side group" as used in the present description means: an offshoot, neither oligomeric nor polymeric from a chain.

"olefin monomer" or "olefin" as used in the present description means: an hydrocarbon compound having a carbon-carbon double bond that can serve as a building block for a polyolefin.

"α-olefin" as used in the present description means: an olefin having a double bond at the α position.

"polyolefin" as used in the present description means: a polymer obtained by the polymerization of olefin monomer.

"polymer chain" as used in the present description means: a chain having a number average molecular weight ($M_n$) of at least 500 g/mol.

"copolymer" as used in the present description means: a polymer derived from more than one type of monomer.

"copolymerization" as used in the present description means: a process to produce a copolymer wherein at least two different types of monomers are used.

"pacifying agent" as used in the present description means: an agent that blocks or protects a functional group to reversibly deactivate that functional group.

"metal-pacified functionalized olefin monomer" as used in the present description means: an olefin monomer having a reactive function which reactive function has reacted with a metal. It is a functionalized olefin monomer that is pacified using a metal in order to reversibly deactivate the functional group.

"metal-pacified functionalized short chain branches" as used in the present description means: short chain branches having a reactive function which reactive function has reacted with a metal. It is a functionalized short chain branch that is pacified using a metal in order to reversibly deactivate the functional group.

"hydrocarbyl chain" as used in the present description means: the hydrocarbyl product of a polymerization reaction according to step A) of the present invention. It may be an oligomeric polyolefin chain having e.g. between 2 and 20 olefin units or it may be a polyolefin chain, i.e. consisting of more than 20 olefin units. It should be noted that "hydrocarbyl chain" and "hydrocarbyl" are not used as synonyms.

"hydrocarbyl" as used in the present description means: a substituent containing hydrogen and carbon atoms; it is a linear, branched or cyclic saturated or unsaturated aliphatic substituent, such as alkyl, alkenyl, alkadienyl and alkynyl; alicyclic substituent, such as cycloalkyl, cycloalkadienyl cycloalkenyl; aromatic substituent, such as monocyclic or polycyclic aromatic substituent, as well as combinations thereof, such as alkyl-substituted aryls and aryl-substituted alkyls. It may be substituted with one or more non-hydrocarbyl, heteroatom-containing substituents. Hence, when in the present description "hydrocarbyl" is used it can also be "substituted hydrocarbyl", unless stated otherwise. Included in the term "hydrocarbyl" are also perfluorinated hydrocarbyls wherein all hydrogen atoms are replaced by fluorine atoms. A hydrocarbyl may be present as a group on a compound (hydrocarbyl group) or it may be present as a ligand on a metal (hydrocarbyl ligand).

"polyethylene-like block" or "polyethylene-like polymer" or "polyethylene-like polymer block" as used in the present description refers a polymer or polymer block that is at least partially miscible with polyethylene that includes but is not limited to for example polyethylene-like polyester blocks. Such kind of polymers or polymer blocks may contain at least 60 mol % of monomer units with at least 10 consecutive between carbonyl group-containing functionalities. So, in the context of the present invention, polyethylene-like polymers considered to be nonpolar.

"cyclic monomer" as used in the present description means: a compound having a ring system, which can be used as a building block in polymerization. The ring system is opened and the ring-opened monomer is attached to the growing polymer chain.

"ring-opening polymerization" or "ROP" as used in the present description means: a form of chain-growth polymerization where cyclic monomers are ring-opened and enchained to form a polymer. It also includes the copolymerization of cyclic monomers with carbon dioxide (e.g. epoxide+$CO_2$).

"initiator" as used in the present description means: a reagent that is capable of initiating ROP or nucleophilic substitution reactions when used with a metal catalyst.

"catalytic initiator" as used in the present description means: a metal-comprising reagent that is capable of initiating and catalyzing ROP or nucleophilic substitution reactions. In other words, a catalytic initiator is a combination of a metal catalyst and an initiator.

"Lewis base ligand" as used in the present description means: a group that is capable of coordinating to the transition metal of a metal catalyst or metal catalyst precursor.

"Pol" as used in the present description means: polyolefin.

"PE" as used in the present description means: polyethylene.

"LDPE" as used in the present description means: low density polyethylene and "LLDPE" as used in the present description means: linear low density polyethylene. LDPE and LLDPE thereby encompass polyethylene with a density for example between 0.85 and 0.95 kg/m³, that can thus also includes especially for example VLDPE and MDPE.

"HDPE" as used in the present description means: high density polyethylene.

"CL" as used in the present description means: ε-caprolactone.

"PCL" as used in the present description means: polycaprolactone.

"PLA" as used in the present description means: polylactide (L, D or DL lactide can be used).

"aPP" as used in the present description means: atactic polypropylene.

"iPP" as used in the present description means: isotactic polypropylene.

"sPP" as used in the present description means: syndiotactic polypropylene.

"EB" as used in the present description means: cyclic ethylene brassylate.

"PEB" as used in the present description means: polyethylene brassylate.

"Amb" as used in the present description means: ambrettolide.

"PAmb" as used in the present description means: polyambrettolide.

"BA" as used in the present description means: cyclic butylene adipate.

"PBA" as used in the present description means: polybutyladipate.

"BS" as used in the present description means: cyclic butylene succinate.

"PBS" as used in the present description means: polybutylsuccinate.

"aPS" as used in the present description means: atactic polystyrene.

"iPS" as used in the present description means: isotactic polystyrene.

"sPS" as used in the present description means: syndiotactic polystyrene.

"PDL" as used in the present description means: pentadecalactone.

"PPDL" as used in the present description means: polypentadecalactone.

"4M1P" as used in the present description means: 4-methyl-1-pentene.

"P4M1P" as used in the present description means: poly-4-methyl-1-pentene.

"iP4M1P" as used in the present description means: isotactic poly-4-methyl-1-pentene.

"-g-" as used in the present description means: graft copolymer, e.g. HDPE-g-PCL is a graft copolymer of PCL grafted onto HDPE.

"-co-" as used in the present description means: random copolymer, e.g. poly(CL-co-PDL) is a random copolymer of CL and PDL.

"nucleophilic substitution" as used in the present description means: a reaction in which a nucleophile attached to a carbonyl group is replaced by another nucleophile.

"transesterification" as used in the present description means: a process of exchanging a nucleophilic alkoxide group of a carboxylic or carbonic acid ester. Transesterification is a special type of nucleophilic substitution using an ester or carbonate functional group.

"carboxylic acid ester functionality" as used in the present description means: an ester group (—O—C(=O)—) bonded to an organic hydrocarbyl group.

"carbonic acid ester functionality" as used in the present description means: a carbonate group (—O—C(=O)—O—) bonded to an organic hydrocarbyl group.

"carbonyl group-containing functionality" as used in the present description means: a carbonyl (>C=O) group bonded to an organic heteroatom-containing group XR', wherein X is selected from O, S, and NR" wherein R' and R" are hydrogen or hydrocarbyl and wherein the carbonyl group is attached to the heteroatom. In the context of the present invention preferably, the polymer for the side chain comprises as the carbonyl group-containing functionality at least one carboxylic acid ester, carbonic acid ester, amide, urethane or urea functionality. The term carbonyl group-containing functionality also includes carboxylic and carbonic ester functionalities in addition to other functionalities. A carbonyl group-containing functionality does therefore preferably refer to a reactive carbonyl group-containing functionality. In the sense of the present invention, it can accordingly preferably not refer to a ketone.

"cyclic ester" as used in the present description means: an ester compound in cyclic form. It also encompasses cyclic oligoesters being a cyclic di-ester, a cyclic tri-ester, a cyclic tetra-ester, a cyclic penta-ester or a higher cyclic oligomeric ester.

"lactone" as used in the present description means: a cyclic ester of a hydroxycarboxylic acid. This is encompassed by the definition of cyclic ester.

"oligolactone" as used in the present description means: a di-lactone, a tri-lactone, a tetra-lactone, a penta-lactone or a higher oligomeric lactone. These are special forms of a lactone and are encompassed by the definition of lactone.

"macrolactone" as used in the present description means: a macrocyclic lactone, being a lactone comprising an ester-functionality and at least 10 consecutive carbon atoms in the ring/cycle. These are special forms of a lactone and are encompassed by the definition of lactone.

These are special forms of a lactone and are encompassed by the definition of lactone.

"macrooligolactones" as used in the present description means: a mixture of cyclic macromono-, macrodi, macriotri-, macrotetra- and macropenta-lactones or higher oligomers. These are special forms of a macrolactone and are encompassed by the definition of macrolactone.

"cyclic amide" as used in the present description means: an amide compound in cyclic form. It also encompasses cyclic oligoamides being a cyclic di-amide, a cyclic tri-amide, a cyclic tetra-amide, a cyclic penta-amide or higher cyclic oligomeric amides.

"cyclic carbonate" as used in the present description means: a carbonate compound in cyclic form. It also encompasses cyclic oligocarbonates being a cyclic di-carbonate, a cyclic tri-carbonate, a cyclic tetra-carbonate, a cyclic penta-carbonate or higher cyclic oligomeric carbonates.

"cyclic urethane" as used in the present description means: a urethane compound in cyclic form. It also encompasses cyclic oligourethanes being a cyclic di-urethane, a cyclic tri-urethane, a cyclic tetra-urethane, a cyclic penta-urethane or a higher cyclic oligomeric urethane.

"cyclic ureas" as used in the present description means: a urea compound in cyclic form. It also encompasses cyclic oligoureas being a cyclic di-urea, a cyclic tri-urea, a cyclic tetra-urea, a cyclic penta-urea or higher cyclic oligomeric ureas.

"HT SEC" as used in the present description means: high temperature size exclusion chromatography. HT SEC can be used as a measure of both the size and the polydispersity of a polymer.

"polydispersity index ($Ɖ$)" as used in the present description means: a value that indicates the distribution of the sizes of polymer molecules ($M_w/M_n$). The method of measuring the $Ɖ$ is explained below. $M_n$ is the number average molecular weight and $M_w$ is the weight average molecular weight.

"chain transfer agent" as used in the present description means: a compound that is capable of interchanging hydrocarbyls and/or hydrocarbyl chains with the active catalyst or other chain transfer agents. It is a metal compound comprising at least one ligand with a weak chemical bond.

"catalyst system" as used in the present description means: a system comprising a metal catalyst or a metal catalyst precursor and optionally a co-catalyst and optionally a scavenger.

"catalyst" as used in the present description means: a species providing the catalytic reaction.

"metal catalyst" as used in the present description means: a catalyst comprising at least one metal center that forms the active site. In the context of the present invention a "metal catalyst" is the same as a "transition metal catalyst" wherein the metal is a transition metal.

"metal catalyst precursor" as used in the present description means: a compound that upon activation forms the active metal catalyst.

"metallocene" as used in the present description means: a metal catalyst or metal catalyst precursor typically consisting of two substituted cyclopentadienyl (Cp) ligands bound to a metal active site.

"transition metal" as used in the present description means: a metal from any of the Groups 3-10 of the IUPAC Periodic Table of elements or in other words a Group 3 metal, a Group 4 metal, a Group 5 metal, a Group 6 metal, a Group 7 metal, a Group 8 metal, a Group 9 metal or a Group 10 metal.

"Group 3 metal" as used in the present description means: a metal selected from Group 3 of the IUPAC Periodic Table of elements, being scandium (Sc), yttrium (Y), lanthanum (La) and other lanthanides (Ce—Lu), and actinium (Ac) and other actinides (Th—Lr).

"Group 4 metal" as used in the present description means: a metal selected from Group 4 of the IUPAC Periodic Table of elements, being titanium (Ti), zirconium (Zr) and hafnium (Hf).

"Group 5 metal" as used in the present description means: a metal selected from Group 5 of the IUPAC Periodic Table of elements, being vanadium (V), niobium (Nb) and tantalum (Ta).

"Group 6 metal" as used in the present description means: a metal selected from Group 6 of the Periodic Table of elements, being chromium (Cr), molybdenum (Mo) and tungsten (W).

"Group 7 metal" as used in the present description means: a metal selected from Group 7 of the Periodic Table of elements, being manganese (Mn), technetium (Tc) and rhenium (Re).

"Group 8 metal" as used in the present description means: a metal selected from Group 8 of the Periodic Table of elements, being iron (Fe), ruthenium (Ru) and osmium (Os).

"Group 9 metal" as used in the present description means: a metal selected from Group 9 of the Periodic Table of elements, being cobalt (Co), rhodium (Rh) and iridium (Ir).

"Group 10 metal" as used in the present description means: a metal selected from Group 10 of the Periodic Table of elements, being nickel (Ni), palladium (Pd) and platinum (Pt).

"main group metal" as used in the present description means: a metal that is an element of Groups 1, 2, and 13-15 of the IUPAC Periodic Table of elements. In other words, metals of:
Group 1: lithium (Li), sodium (Na), and potassium (K)
Group 2: beryllium (Be), magnesium (Mg), and calcium (Ca)
Group 13: boron (B), aluminum (Al), gallium (Ga), and indium (In)
Group 14: germanium (Ge), and tin (Sn)
Group 15: antimony (Sb), and bismuth (Bi)
main group metals also include for the context of the present invention zinc (Zn).

"co-catalyst" as used in the present description means: a compound that activates the metal catalyst precursor to obtain the active metal catalyst.

"scavenger" as used in the present description means: a compound that reacts with impurities present in the polymerization reactor, solvent and monomer feed, thereby preventing poisoning of the catalyst during the olefin polymerization process.

"methylaluminoxane" or "MAO" as used in the present description means: a compound derived from the partial hydrolysis of trimethyl aluminum that serves as an co-catalyst for catalytic olefin polymerization.

"SMAO" as used in the present description means: supported methylaluminoxane, viz. a methylaluminoxane bound to a solid support.

"DMAO" as used in the present description means: depleted methylaluminoxane, viz. a methylaluminoxane from which the free trimethyl aluminum has been removed.

"MMAO" as used in the present description means: modified methylaluminoxane, viz. the product obtained after partial hydrolysis of trimethyl aluminum plus another trialkyl aluminum such as tri(i-butyl) aluminum or tri-n-octyl aluminum.

"fluorinated aryl borane or fluorinated aryl borate" as used in the present description means: a borate compound having three or four fluorinated (preferably perfluorinated) aryl ligands or a borane compound having three fluorinated (preferably perfluorinated) aryl ligands.

"halide" as used in the present description means: an ion selected from the group consisting of: fluoride ($F^-$), chloride ($Cl^-$), bromide ($Br^-$) and iodide ($I^-$).

"halogen" as used in the present description means: an atom selected from the group consisting of: fluorine (F), chlorine (Cl), bromine (Br) and iodine (I).

"heteroatom" as used in the present description means: an atom other than carbon or hydrogen. Heteroatom also includes halides.

"heteroatom selected from Group 14, 15, 16 or 17 of the IUPAC Periodic Table of the Elements" as used in the present description means: a hetero atom selected from Si, Ge, Sn [Group 14], N, P, As, Sb, Bi [Group 15], 0, S, Se, Te [Group 16], F, Cl, Br, I [Group 17].

"alkyl" as used in the present description means: a group consisting of carbon and hydrogen atoms having only single carbon-carbon bonds. An alkyl group may be straight or branched, un-substituted or substituted. It may contain aryl substituents. It may or may not contain one or more heteroatoms, such as oxygen (O), nitrogen (N), phosphorus (P), silicon (Si), tin (Sn) or sulfur (S) or halogen (i.e. F, Cl, Br, I).

"aryl" as used in the present description means: a substituent derived from an aromatic ring. An aryl group may or may not contain one or more heteroatoms, such as oxygen (O), nitrogen (N), phosphorus (P), silicon (Si), tin (Sn), sulfur (S) or halogen (i.e. F, Cl, Br, I). An aryl group also encloses substituted aryl groups wherein one or more hydrogen atoms on the aromatic ring have been replaced by hydrocarbyl groups.

"alkoxide" or "alkoxy" as used in the present description means: a substituent obtained by deprotonation of an aliphatic alcohol. It consists of an alkyl group bonded to an oxygen atom.

"aryloxide" or "aryloxy" or "phenoxide" as used in the present description means: a substituent obtained by deprotonation of an aromatic alcohol. It consists of an aryl group bonded to an oxygen atom.

"silyl group" as used in the present description means: a linear, branched or cyclic substituent containing 1-20 silicon atoms. Said silyl group may comprise Si—Si single or double bonds.

Expressions like for example "C1-C20" and similar formulations may refer to a range regarding a number of carbon atoms, here for example from 1 to 20 carbon atoms.

DETAILED DESCRIPTION OF THE INVENTION

The present invention relates to the novel and inventive cascade-like process for the preparation of graft copolymers comprising a polyolefin main chain and one or a multiple polymer side chains and the products obtained therefrom, which polymers have finely tuned parameters, such as polarity. The polymer side chains may be polar or nonpolar.

The key to the present invention is the use of two different types of olefin monomers, a first type of olefin monomer and a second type of olefin comonomer having a metal-pacified functional group in step A), resulting in a random copolymer containing short chain branches having metal-pacified functional groups, which can directly be used as catalytic initiator for the subsequent step B), consisting of the formation of the graft copolymer. This may avoid the need to work-up, purify or dry the intermediate functionalized polyolefin and avoid the need to use an additional catalyst for the step of forming the side chains.

The inventive process comprises at least two steps. During the first step, step A), the polyolefin main chain is prepared having one or multiple (e.g. a plurality) of reactive side groups, necessary during the second step, step B), to form the graft copolymer.

The formation of the polymer side chains can either be carried out by growing these polymer side chains from the metal-pacified functionalized short chain branches on the polyolefin main chain obtained in step (A) used as catalytic initiators (grafting from approach) or by attaching a pre-synthesized polymer to the metal-pacified functionalized short chain branches on the polyolefin main chain obtained in step (A) used as catalytic initiators Step A) is related to polymerizing at least two different types of monomers, of which one has a metal-pacified functionalized group, using a catalyst system to obtain a polyolefin main chain containing randomly placed metal-pacified short chain branches.

The catalyst system used in step A) comprises: i) a Group 3-10, preferably a Group 3-8, metal catalyst or metal catalyst precursor; and ii) optionally a co-catalyst.

Step B) relates to forming polymer side chains at the short chain branches on the polyolefin main chain obtained in step A). Said polyolefin main chain of step A) contains one or multiple metal-pacified functionalized short chain branches. In other words, step B) relates to the formation of the graft copolymer.

There are several synthetic routes according to the present invention in which the graft copolymer might be formed during step B). It might for example be grown via ROP or it may be added via nucleophilic substitution.

In an embodiment, step B) relates to obtaining a graft copolymer and is carried out by ROP of a cyclic monomer using the metal-functionalized side chain branches on the polyolefin main chain obtained in step A) as catalytic initiator.

In an embodiment, step B) relates to obtaining a graft copolymer and is carried out by nucleophilic substitution, especially for example transesterification, of a polymer for the side chains comprising at least one carbonyl group-containing functionality, especially for example a carboxylic or carbonic acid ester functionality using the metal-functionalized side chain branches on the polyolefin main chain obtained in step A) as catalytic initiator.

In an embodiment, step B) relates to obtaining a graft copolymer and is carried out by a combination of ROP and nucleophilic substitution, using the metal-functionalized side chain branches on the polyolefin main chain obtained in step A) as catalytic initiators. ROP and nucleophilic substitution can be carried out simultaneously. Alternatively, first, a nucleophilic substitution is carried out using a polymer comprising at least one carbonyl group-containing functionality using the metal-functionalized side chain branches on the polyolefin main chain obtained in step A) as catalytic initiators to obtain the side chains. Subsequently, ROP is carried out by adding cyclic monomers to the metal-functionalized graft copolymers obtained in the first sub-step of step B), which functions as catalytic initiators for the ROP.

Preferably, said all process steps are carried out directly one after another.

Preferably, the process steps A) and B) can be carried out without hydrolysis and/or intermediate workup.

Preferably, the process is carried out in a series of reactors.

Each of these steps will be discussed in more detail below and embodiments are discussed below.

Step A): Preparation of a Polyolefin Main Chain

The first step in the process according to the present invention is the preparation of a polyolefin main chain that has reactive electrophilic metal pending groups. The product obtained in step A) is then a metal-pacified functionalized side chain-containing polyolefin.

During step A) of the inventive process a copolymerization is carried out. At least two different olefin monomers are used; one of which is a functionalized olefin having a heteroatom-containing functional group which functionality has been pacified with a pacifying metal. This copolymerization reaction leads to a random copolymer having one or more metal-pacified functionalized short chain branches. The metal-pacified functionalized short chain branches are the reactive substituents to be used in step B) to obtain the graft copolymer.

In an embodiment of the present invention, the first type of olefin monomer has the following structure according to Formula I-A:

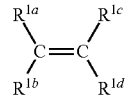

wherein C is carbon and wherein $R^{1a}$, $R^{1b}$, $R^{1c}$, and $R^{1d}$ are each independently selected from the group consisting of H or hydrocarbyl with 1 to 16 carbon atoms.

The hydrocarbyl may for example be an alkyl, alkenyl, alkadienyl and alkynyl. It may also be an alicyclic substituent, such as cycloalkyl, cycloalkadienyl cycloalkenyl. It may also be an aromatic substituent, such as monocyclic or polycyclic aromatic substituent, as well as combinations thereof, such as alkyl-substituted aryls and aryl-substituted alkyls. The hydrocarbyl may be substituted with one or more non-hydrocarbyl-containing groups e.g. a heteroatom.

Preferably, the olefin monomer according to Formula I-A is selected from the group consisting of ethylene, propylene, 1-butene, 4-methyl-1-pentene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-cyclopentene, cyclohexene, norbornene, ethylidene-norbornene, and vinylidene-norbornene and one or more combinations thereof. Preferably, said first type of olefin monomer is ethylene or propylene.

In addition, a combination of ethylene or propylene on the one hand and one or more other olefins on the other hand can also be used as the first type of olefin monomer. Substituted analogues of the monomers discussed above may also be used, e.g. substituted by one or more halogens. Also aromatic monomers may be used according to the present invention. It is also possible to use a combination of two or more olefins, such as a combination of ethylene with α-olefins to arrive at an LLDPE-side chain.

In an embodiment of the present invention, the second metal-pacified functionalized olefin monomer has the following structure according to Formula I-B:

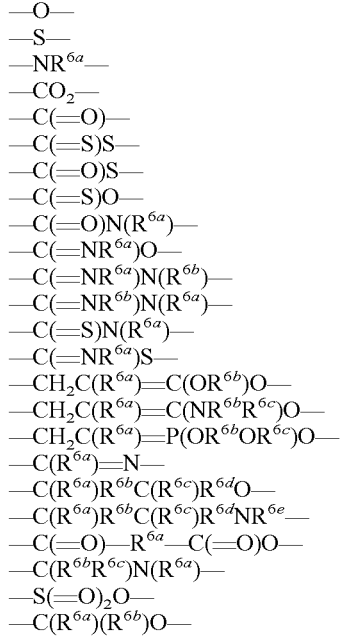

wherein C is carbon, wherein $R^2$, $R^3$, and $R^4$ are each independently selected from the group consisting of H or hydrocarbyl with 1 to 16 carbon atoms, wherein $R^5$—X—$ML_n$ is a metal-pacified heteroatom-containing functional group.

In an embodiment, $R^5$ is either not present in which case $R^5$—X—$ML_n$ can be also written as X—$ML_n$ or in another embodiment $R^5$ is a hydrocarbyl group. It should be noted that when X is a heteroatom-containing group, the heteroatom is bonded to M.

Preferably, X is a heteroatom or heteroatom-containing group selected from the group consisting of:
—O—
—S—
—$NR^{6a}$—
—$CO_2$—
—C(═O)—
—C(═S)S—
—C(═O)S—
—C(═S)O—
—C(═O)N($R^{6a}$)—
—C(═$NR^{6a}$)O—
—C(═$NR^{6a}$)N($R^{6b}$)—
—C(═$NR^{6b}$)N($R^{6a}$)—
—C(═S)N($R^{6a}$)—
—C(═$NR^{6a}$)S—
—$CH_2$C($R^{6a}$)═C(O$R^{6b}$)O—
—$CH_2$C($R^{6a}$)═C(N$R^{6b}R^{6c}$)O—
—$CH_2$C($R^{6a}$)═P(O$R^{6b}$O$R^{6c}$)O—
—C($R^{6a}$)═N—
—C($R^{6a}$)$R^{6b}$C($R^{6c}$)$R^{6d}$O—
—C($R^{6a}$)$R^{6b}$C($R^{6c}$)$R^{6d}$N$R^{6e}$—
—C(═O)—$R^{6a}$—C(═O)O—
—C($R^{6b}R^{6c}$)N($R^{6a}$)—
—S(═O)$_2$O—
—C($R^{6a}$)($R^{6b}$)O—

Preferably, said heteroatom from said heteroatom-containing group X is O, S, N or one or more combinations thereof.

Preferably, $R^{6a}$, $R^{6b}$, $R^{6c}$, $R^{6d}$, $R^{6e}$ are each independently selected from the group consisting of H or hydrocarbyl with 1 to 16 carbon atoms. Preferably, $ML_n$ is a metal ligated with one or more ligands L. Preferably, n is 0, 1, 2 or 3. Herein the total charge of $L_n$ corresponds to the oxidation state of the metal minus 1.

M is the pacifying metal, preferably selected from the group consisting of: magnesium, calcium, boron, aluminum, gallium, bismuth, titanium, zinc, and one or more combinations thereof.

Preferably, ligand L is independently selected from the group consisting of hydride, hydrocarbyl, halide, alkoxide, aryloxide, amide, thiolate, mercaptate, carboxylate, carbamate, salen, salan, salalen, guanidinate, porphyrin, β-ketiminate, phenoxy-imine, phenoxy-amine, bisphenolate, trisphenolate, alkoxyamine, alkoxyether, alkoxythioether, subcarbonate and subsalicylate or combinations thereof.

In a preferred embodiment, the compound according to Formula I-B is a metal-pacified hydroxyl α-olefin or metal-pacified hydroxyl-functionalized ring-strained cyclic olefin monomer, preferably an aluminum-pacified hydroxyl olefin monomer.

Metal-pacified hydroxyl α-olefin monomers correspond to Formula I-B wherein $R^2$, $R^3$, and $R^4$ are each H and wherein X is —O— and wherein $R^5$ is either —C($R^{7a}$)($R^{7b}$)— or a plurality of —C($R^{7a}$)($R^{7b}$)— groups, wherein $R^{7a}$, and $R^{7b}$ are each independently selected from the group consisting of H or hydrocarbyl with 1 to 16 carbon atoms. An example of an $R^5$ group is —(CH$_2$)$_9$—.

Metal-pacified hydroxy-functionalized ring-strained cyclic olefins (also called internal olefins) are typically hydroxyl functionalized norbornenes, preferably metal-pacified 5-norbornene-2-methanol. They correspond to Formula I-B wherein $R^2$ and $R^4$ are H and $R^3$ and $R^5$ together for a ring structure that is functionalized with X-$ML_n$, wherein X is —O—.

Preferably, said metal-pacified functionalized olefin monomer is prepared in situ before the metal catalyst or metal catalyst precursor is added. The metal-pacified functionalized olefin monomer can for example be prepared by the deprotonation reaction of a protic functionalized olefin monomer according to Formula I-C (below) with a metal pacifying agent.

Formula I-C

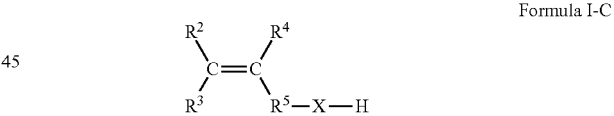

In an embodiment, the metal pacifying agent is selected from metal hydrocarbyl species $L_nMR^{7c}{}_p$. L, M and n are as specified above. $R^{7c}$ is a hydride or hydrocarbyl with 1 to 16 carbon atoms and p is 1, 2 or 3. Herein the total charge of $L_n$+$R^{7c}$p corresponds to the oxidation state of the metal.

Preferably, the metal pacifying agent is a mono-, di- or trihydrocarbyl aluminum, mono-, di- or trihydrocarbyl boron, mono-, di- or trihydro boron, mono-, di- or trihydrocarbyl gallium, mono-, di- or trihydrocarbyl bismuth, mono- or dihydrocarbyl zinc, mono- or dihydrocarbyl magnesium, mono- or dihydrocarbyl calcium, mono-, di-, tri- or tetrahydrocarbyl titanium and one or more combinations thereof.

Preferably, said metal pacifying agent is selected from trimethyl aluminum, triethyl aluminum, tri(i-propyl) aluminum, tri(n-butyl) aluminum, tri(i-butyl) aluminum (TIBA), tri(t-butyl) aluminum, tri(n-hexyl) aluminum, tri(n-octyl) aluminum, di(i-butyl) aluminum hydride (DIBALH), dimethyl aluminum 2,6-di(t-butyl)-4-methyl-phenoxide, diethyl aluminum 2,6-di(t-butyl)-4-methyl-phenoxide, di(i-butyl)

aluminum 2,6-di(t-butyl)-4-methyl-phenoxide, i-butyl aluminum-bis(di-trimethylsilyl)amide), n-octyl aluminum-di(pyridine-2-methoxide), bis(n-octadecyl)-i-butyl aluminum, i-butyl aluminum-bis(di(n-pentyl)amide), n-octyl aluminum-bis(2,6-di-t-butylphenoxide), n-octyl aluminum-di-ethyl(1-naphthyl)amide), ethyl aluminum-bis(t-butyldimethylsiloxide), ethyl aluminum-di(bis(trimethylsilyl)amide), ethyl aluminum-bis(2,3,6,7-dibenzo-1-azacycloheptane-amide), n-octyl aluminum-bis(2,3,6,7-dibenzo-1-azacycloheptane-amide), n-octyl-aluminum-bis(dimethyl(t-butyl)siloxide, trimethyl gallium, triethyl gallium, tri(i-butyl) gallium, di-n-butyl magnesium (DBM), dimethyl magnesium, butyl-octyl-magnesium, butyl-ethyl-magnesium, butyl magnesium 2,6-di(t-butyl)-4-methyl-phenoxide, benzyl calcium 2,6-di(t-butyl)-4-methyl-phenoxide, methyl zinc 2,6-di(t-butyl)-4-methyl-phenoxide, diethyl zinc (DEZ), dimethyl zinc, di-isopropyl zinc, di-t-butyl zinc, di-(n-hexyl) zinc, ethyl zinc (t-butoxide), ethyl zinc 2,6-di(t-butyl)-4-methyl-phenoxide, trimethyl boron, tributyl boron, diethyl boron 2,6-di(t-butyl)-4-methyl-phenoxide, 9-borabicyclo(3.3.1)nonane, catecholborane, diborane.

In an embodiment, the metal pacifying agent is selected from the group consisting TIBA, DIBALH, DBM, DEZ.

It should be noted that the metal pacifying agent might also act as a chain transfer agent during the polymerization reaction of step A).

Catalyst System Suitable for Use in Step A)

A catalyst system for use in step a) comprises the following components:
  i) a metal catalyst or metal catalyst precursor comprising a metal from Group 3-10 of the IUPAC Periodic Table of elements; and
  ii) optionally a co-catalyst;
  iii) optionally a scavenger.

Suitable metal catalysts and/or metal catalyst precursors are discussed in this section as well as suitable co-catalysts, which are optional. A metal catalyst for step A) can be used without co-catalyst, a metal catalyst precursor for step A) requires a co-catalyst to obtain the actual active catalyst.

Metal Catalyst or Metal Catalyst Precursor Suitable for Step A)

In the section below several examples for metal catalysts or metal catalyst precursors, which may be used to prepare the metal catalyst according to the present invention, are specified. Metal catalysts that are suitable for use in step A) of the present invention may be obtained by reacting the metal catalyst precursors with a co-catalyst either prior to use in step A) or by in situ reaction with a co-catalyst.

According to the present invention, the metal catalyst has a metal center selected from a Group 3 metal, a Group 4 metal, a Group 5 metal, a Group 6 metal, a Group 7 metal, a Group 8 metal, a Group 9 metal or a Group 10 metal, preferably Y, Ti, Zr, Hf, V, Cr, Fe, Co, Ni, Pd.

A metal catalyst or a metal catalyst precursor according to the invention may be for example a single-site catalyst or Ziegler-Natta catalyst.

Ziegler-Natta catalyst as used in the present description means: a transition metal-containing solid catalyst compound comprises a transition metal halide selected from titanium halide, chromium halide, hafnium halide, zirconium halide, and vanadium halide, supported on a metal or metalloid compound (e.g. a magnesium compound or a silica compound). An overview of such catalyst types is for example given by T. Pullukat and R. Hoff in Catal. Rev.—Sci. Eng. 41, vol. 3 and 4, 389-438, 1999. The preparation of such a procatalyst is for example disclosed in WO96/32427 A1. Ziegler-Natta catalysts as reported in US2009/0048399, US2014/0350200, WO96/32427, WO01/23441, WO2007/134851, U.S. Pat. No. 4,978,648, EP1283 222A1, U.S. Pat. Nos. 5,556,820; 4,414,132; 5,106,806 and 5,077,357 may also be suitable to use as metal catalyst precursors in the present invention.

The metal catalysts or metal catalyst precursors may for example be a $C_s$-, $C_1$- or $C_2$-symmetric zirconium or hafnium metallocene, preferably an indenyl substituted zirconium or hafnium dihalide, more preferably a bridged bis-indenyl zirconium or hafnium dihalide, even more preferably rac-dimethylsilyl bis-indenyl zirconium or hafnium dichloride (rac-Me$_2$Si(Ind)$_2$ZrCl$_2$ and rac-Me$_2$Si(Ind)$_2$HfCl$_2$, respectively), or rac-dimethylsilyl bis-(2-methyl-4-phenyl-indenyl) zirconium or hafnium dichloride (rac-Me$_2$Si(2-Me-4-Ph-Ind)$_2$ZrCl$_2$ and rac-Me$_2$Si(2-Me-4-Ph-Ind)$_2$HfCl$_2$, respectively).

According to the invention, said catalyst precursor can be for example a so-called half-metallocene, or constrained geometry catalyst, even more preferably, $C_5Me_5[(C_6H_{11})_3P=N]TiCl_2$, [Me$_2$Si(C$_5$Me$_4$)N(tBu)]TiCl$_2$, [C$_5$Me$_4$(CH$_2$CH$_2$NMe$_2$)]TiCl$_2$. According to the invention, said catalyst can be for example a so-called post-metallocene, preferably [Et$_2$NC(N(2,6-iPr$_2$—C$_6$H$_3$)]TiCl$_3$ or [N-(2,6-di(1-methylethyl)phenyl)amido)(2-isopropylphenyl)(α-naphthalen-2-diyl(6-pyridin-2-diyl)methane)]hafnium dimethyl.

The metal catalyst or metal catalyst precursor can also be for example a preferably $C_s$ or $C_1$ symmetric compound according to the formula $(C_5R^8_4)R^9(C_{13}R^8_8)ML^1_n$, where $C_5R^8_4$ is an unsubstituted or substituted cyclopentadienyl, and $C_{13}R^{11}_8$ is an unsubstituted fluorenyl group or a substituted fluorenyl group; and the bridging $R^9$ group is selected from the group consisting of —Si(Me)$_2$-, —Si(Ph)$_2$-, —C(Me)$_2$- or —C(Ph)$_2$-, thus producing $C_1$- and $C_s$-symmetric metallocenes.

Non-limiting examples of zirconocene dichloride metal catalyst precursors suitable for use in the present invention include: bis(cyclopentadienyl) zirconium dichloride, bis(methyl-cyclopentadienyl) zirconium dichloride, bis(n-propyl-cyclopentadienyl) zirconium dichloride, bis(n-butyl-cyclopentadienyl) zirconium dichloride, bis(1,3-dimethyl-cyclopentadienyl) zirconium dichloride, bis(1,3-di-t-butyl-cyclopentadienyl) zirconium dichloride, bis(1,3-ditrimethylsilyl-cyclopentadienyl) zirconium dichloride, bis(1,2,4-trimethyl-cyclopentadienyl) zirconium dichloride, bis(1,2,3,4-tetramethylcyclopentadienyl) zirconium dichloride, bis(pentamethylcyclopentadienyl) zirconium dichloride, bis(indenyl) zirconium dichloride, bis(2-phenyl-indenyl) zirconium dichloride, bis(fluorenyl) zirconium dichloride, bis(tetrahydrofluorenyl) zirconium dichloride, dimethylsilyl-bis(cyclopentadienyl) zirconium dichloride, dimethylsilyl-bis(3-t-butyl-cyclopentadienyl) zirconium dichloride, dimethylsilyl-bis(3-trimethylsilyl-cyclopentadienyl) zirconium dichloride, dimethylsilyl-bis(tetrahydrofluorenyl) zirconium dichloride, dimethylsilyl-(1-indenyl)(cyclopentadienyl) zirconium dichloride, dimethylsilyl-(1-indenyl)(fluorenyl) zirconium dichloride, dimethylsilyl-(1-indenyl)(octahydrofluorenyl) zirconium dichloride, rac-dimethylsilyl-bis(2-methyl-3-t-butyl-cyclopentadienyl) zirconium dichloride, rac-dimethylsilyl-bis(1-indenyl) zirconium dichloride, rac-dimethylsilyl-bis(4,5,6,7-tetrahydro-1-indenyl) zirconium dichloride, rac-dimethylsilyl-bis(2-methyl-1-indenyl) zirconium dichloride, rac-dimethylsilyl-bis(4-phenyl-1-indenyl) zirconium dichloride, rac-dimethylsilyl-bis(2-methyl-4-phenyl-1-indenyl) zirconium dichloride, rac-ethylene-bis(1-indenyl) zirconium dichloride, rac-ethylene-bis(4,5,6,7-tetrahydro-1-indenyl) zirconium dichloride, rac-1,1,2,2-tetramethylsilanylene-bis(1-indenyl) zirconium dichloride, rac-1,1,2,2-tetramethylsilanylene-bis(4,5,6,7-tetrahydro-1-indenyl) zirconium dichloride, rac-ethylidene(1-indenyl)(2,3,4,5-tetramethyl-1-cyclopentadienyl) zirconium dichloride, rac-[1-(9-fluorenyl)-2-(2-methylbenzo[b]indeno[4,5-d]thiophen-1-yl)ethane]zirconium dichloride, dimethylsilyl bis(cyclopenta-phenanthren-3-ylidene) zirconium dichloride, dimethylsilyl bis(cyclopenta-phenanthren-1-ylidene) zirconium dichloride, dimethylsilyl bis(2-methyl-cyclopenta-phenanthren-1-ylidene) zirconium dichloride, dimethylsilyl bis(2-methyl-3-benz-inden-3-ylidene) zirconium dichloride, dimethylsilyl-bis[(3a,4,5,6,6a)-2,5-dimethyl-3-(2-methyl-phenyl)-6H-cyclopentathien-6-ylidene] zirconium dichloride, dimethylsilyl-(2,5-dimethyl-1-phenylcyclopenta[b]pyrrol-4(1H)-ylidene)(2-methyl-4-phenyl-1-indenyl) zirconium dichloride, bis(2-methyl-1-cyclopenta-phenanthren-1-yl)zirconium dichloride, [ortho-bis(4-phenyl-2-indenyl) benzene] zirconium dichloride, [ortho-bis(5-phenyl-2-indenyl) benzene] zirconium dichloride, [ortho-bis(2-indenyl)benzene] zirconium dichloride, [ortho-bis(1-methyl-2-indenyl)benzene] zirconium dichloride, [2,2'-(1,2-phenyldiyl)-1,1'dimethylsilyl-bis(indenyl)] zirconium dichloride, [2,2'-(1,2-phenyldiyl)-1,1'-(1,2-ethanediyl)-bis(indenyl)] zirconium dichloride, dimethylsilyl-(cyclopentadienyl)(9-fluorenyl) zirconium dichloride, diphenylsilyl-(cyclopentadienyl)(fluorenyl) zirconium dichloride, dimethylmethylene-(cyclopentadienyl)(fluorenyl) zirconium dichloride, diphenylmethylene-(cyclopentadienyl)(fluorenyl) zirconium dichloride, dimethylmethylene-(cyclopentadienyl)(octahydrofluorenyl) zirconium dichloride, diphenylmethylene-(cyclopentadienyl)(octahydrofluorenyl) zirconium dichloride, dimethylmethylene-(cyclopentadienyl)(2,7-di-t-butyl-fluorenyl) zirconium dichloride, diphenylmethylene-(cyclopentadienyl)(2,7-di-t-butyl-fluorenyl) zirconium dichloride, dimethylmethylene-(3-methyl-1-cyclopentadienyl)(fluorenyl) zirconium dichloride, diphenylmethylene-(3-methyl-1-cyclopentadienyl)(fluorenyl) zirconium dichloride, dimethylmethylene-(3-cyclohexyl-1-cyclopentadienyl)(fluorenyl) zirconium dichloride, diphenylmethylene-(3-cyclohexyl-1-cyclopentadienyl)(fluorenyl) zirconium dichloride, dimethylmethylene-(3-t-butyl-1-cyclopentadienyl)(fluorenyl) zirconium dichloride, diphenylmethylene-(3-t-butyl-1-cyclopentadienyl)(fluorenyl) zirconium dichloride, dimethylmethylene-(3-ademantyl-1-cyclopentadienyl)(fluorenyl) zirconium dichloride, diphenylmethylene-(3-ademantyl-1-cyclopentadienyl)(fluorenyl) zirconium dichloride, dimethylmethylene-(3-methyl-1-cyclopentadienyl)(2,7-di-t-butyl-fluorenyl) zirconium dichloride, diphenylmethylene-(3-methyl-1-cyclopentadienyl)(2,7-di-t-butyl-fluorenyl) zirconium dichloride, dimethylmethylene-(3-cyclohexyl-1-cyclopentadienyl)(2,7-di-t-butyl-fluorenyl) zirconium dichloride, diphenylmethylene-(3-cyclohexyl-1-cyclopentadienyl)(2,7-di-t-butyl-fluorenyl) zirconium dichloride, dimethylmethylene-(3-t-butyl-1-cyclopentadienyl)(2,7-di-t-butyl-fluorenyl) zirconium dichloride, diphenylmethylene-(3-t-butyl-1-cyclopentadienyl)(2,7-di-t-butyl-fluorenyl) zirconium dichloride, dimethylmethylene-(3-methyl-cyclopentadienyl)(octahydro-octamethyl-dibenzo-fluorenyl) zirconium dichloride, diphenylmethylene-(3-methyl-cyclopentadienyl)(octahydro-octamethyl-dibenzo-fluorenyl) zirconium dichloride, dimethylmethylene-(3-cyclohexyl-cyclopentadienyl)(octahydro-octamethyl-dibenzo-fluorenyl) zirconium dichloride, diphenylmethylene-(3-cyclohexyl-cyclopentadienyl)(octahydro-octamethyl-dibenzo-fluorenyl) zirconium dichloride, dimethylmethylene-(3-t-butyl-cyclopentadienyl)(octahydro-octamethyl-dibenzo-fluorenyl) zirconium dichloride, diphenylmethylene-(3-t-butyl-cyclopentadienyl)(octahydro-octamethyl-dibenzo-fluorenyl) zirconium dichloride, dimethylmethylene-(3-ademantyl-cyclopentadienyl)(octahydro-octamethyl-dibenzo-fluorenyl) zirconium dichloride, diphenylmethylene-(3-ademantyl-cyclopentadienyl)(octahydro-octamethyl-dibenzo-fluorenyl) zirconium dichloride.

In a preferred embodiment, the metal catalyst or metal catalyst precursor can be for example: [[2,2'-[[[2-(dimethylamino-κN)ethyl]imino-κN]bis(methylene)]bis[4,6-bis(1,1-dimethylethyl) phenolato-κO]] zirconium dibenzyl, (phenylmethyl)[[2,2'-[(propylimino-κN)bis(methylene)]bis[4,6-bis(1,1-dimethylethyl)phenolato-κO]] zirconium dibenzyl or (phenylmethyl)[[2,2'-[[[(2-pyridinyl-κN)methyl]imino-κN]bis(methylene)]bis[4,6-bis(1,1-dimethylethyl)phenolato-κO]] zirconium dibenzyl.

In a preferred embodiment, complexes as reported in WO 00/43426, WO 2004/081064, US 2014/0039138 A1, US 2014/0039139 A1 and US 2014/0039140 A1 are suitable to use as metal catalyst precursors for the processes of the present invention.

Compounds analogous to those listed above but where Zr has been replaced by Hf, so called hafnocenes, may also be used according to the as catalyst precursors present invention.

The metal catalysts or metal catalyst precursors for use in the present invention may also be from post-metallocene catalysts or catalyst precursors.

In a preferred embodiment, the metal catalyst or metal catalyst precursor may be [HN(CH2CH2N-2,4,6-Me3-C6H2)2]Hf(CH2Ph)2 or bis[N,N'-(2,4,6-trimethylphenyl)amido)ethylenediamine]hafnium dibenzyl.

In a another preferred embodiment, the metal catalyst or metal catalyst precursor may be 2,6-diisopropylphenyl-N-(2-methyl-3-(octylimino)butan-2) hafnium trimethyl, 2,4,6-trimethylphenyl-N-(2-methyl-3-(octylimino)butan-2) hafnium trimethyl.

In a preferred embodiment, the metal catalyst or metal catalyst precursor may be [2,6-iPr2C6H3NC(2-iPr-C6H4)-2-(6-C5H6)]HfMe2-[N-(2,6-di(1-methylethyl)phenyl) amido)(2-isopropylphenyl) (□-naphthalen-2-diyl(6-pyridin-2-diyl)methane)]hafnium dimethyl.

Other non-limiting examples of metal catalyst precursors according to the present invention are: [N-(2,6-di(1-methylethyl)phenyl)amido)(o-tolyl)(α-naphthalen-2-diyl(6-pyridin-2-diyl)methane)] hafnium dimethyl, [N-(2,6-di(1-methylethyl)phenyl)amido)(o-tolyl)(α,α-naphthalen-2-diyl(6-pyridin-2-diyl)methane)] hafnium di(N,N-dimethylamido), [N-(2,6-di(1-methylethyl)phenyl)amido)(o-tolyl)(α,α-naphthalen-2-diyl(6-pyridin-2-diyl)methane)] hafnium dichloride, [N-(2,6-di(1-methylethyl)phenyl)amido)(phenanthren-5-yl)(α,α-naphthalen-2-diyl (6-pyridin-2-diyl)methane)] hafnium dimethyl, [N-(2,6-di(1-methylethyl)phenyl)amido)(phenanthren-5-yl)(α-naphthalen-2-diyl(6-pyridin 2-diyl)methane)] hafnium di(N,N-dimethylamido), [N-(2,6-di(1-methylethyl)phenyl)amido)(phenanthren-5-yl) (α-naphthalen-2-diyl(6-pyridin-2-diyl) methane)] hafnium dichloride. Other non-limiting examples include the family of pyridyl diamide metal dichloride complexes such as: [N-[2,6-bis(1-methylethyl)phenyl]-6-[2-[phenyl(phenylamino-κN)methyl]phenyl]-2-pyridinemethanaminato(2−)-κN1,κN2]hafnium dichloride, [N-[2,6-bis(1-methylethyl)phenyl]-6-[2-[(phenylamino-κN)methyl]-1-naphthalenyl]-2-pyridinemethanaminato(2−)-κN1,κN2] hafnium dichloride, [N-[2,6-bis(1-methylethyl)phenyl]-α-[2-(1-methylethyl)phenyl]-6-[2-[(phenylamino-κN)methyl]phenyl]-2-pyridinemethanaminato(2−)-κN1,κN2] hafnium dichloride, [N-(2,6-diethylphenyl)-6-[2-[phenyl(phenylamino-κN)methyl]-1-naphthalenyl]-2-pyridinemethanaminato(2−)-κN1,κN2]zirconium dichloride, [4-methyl-2-[[2-phenyl-1-(2-pyridinyl-κN)ethyl]amino-κN]phenolato (2−)-κO]bis(phenylmethyl)hafnium bis(phenylmethyl), [2-(1,1-dimethylethyl)-4-methyl-6-[[2-phenyl-1-(2-pyridinyl-κN)ethyl]amino-κN]phenolato(2−)-κO] hafnium bis(phenylmethyl), [2-(1,1-dimethylethyl)-4-methyl-6-[[phenyl(2-pyridinyl-κN)methyl]amino-κN]phenolato(2−)-κO]hafnium bis(phenylmethyl).

Non-limiting examples of titanium dichloride metal catalyst precursors suitable for use in the present invention include: cyclopentadienyl(P,P,P-tri-t-butylphosphine imidato) titanium dichloride, pentafluorophenylcyclopentadienyl(P,P,P-tri-t-butylphosphine imidato) titanium dichloride, pentamethylcyclopentadienyl(P,P,P-tri-t-butylphosphine imidato) titanium dichloride, 1,2,3,4-tetraphenyl-cyclopentadienyl(P,P,P-tri-t-butylphosphine imidato) titanium dichloride, cyclopentadienyl(P,P,P-tricyclohexylphosphine imidato) titanium dichloride, pentafluorophenyl cyclopentadienyl(P,P,P-tricyclohexylphosphine imidato) titanium dichloride, pentamethylcyclopentadienyl(P,P,P-tricyclohexylphosphine imidato) titanium dichloride, 1,2,3,4-tetraphenyl-cyclopentadienyl(P,P,P-tricyclohexylphosphine imidato) titanium dichloride, pentamethylcyclopentadienyl (P,P-dicyclohexyl-P-(phenylmethyl)phosphine imidato) titanium dichloride, cyclopentadienyl(2,6-di-t-butyl-4-methylphenoxy) titanium dichloride, pentafluorophenylcyclopentadienyl(2,6-di-t-butyl-4-methylphenoxy) titanium dichloride, pentamethylcyclopentadienyl(2,6-di-t-butyl-4-methylphenoxy) titanium dichloride, 1,2,3-trimethyl-cyclopentadienyl(2,6-bis(1-methylethyl) phenolato) titanium dichloride, [(3a,4,5,6,6a-η)-2,3,4,5,6-pentamethyl-3aH-cyclopenta[b]thien-3a-yl](2,6-bis(1-methylethyl)phenolato) titanium dichloride, pentamethylcyclopentadienyl(N,N'-bis(1-methylethyl)ethanimidamidato) titanium dichloride, pentamethylcyclopentadienyl(N,N'-dicyclohexylbenzenecarboximidamidato) titanium dichloride, pentamethylcyclopentadienyl(N,N'-bis(1-methylethyl)benzenecarboximidamidato) titanium dichloride, cyclopentadienyl(1,3-bis(1,1-dimethylethyl)-2-imidazolidiniminato) titanium dichloride, cyclopentadienyl (1,3-dicyclohexyl-2-imidazolidiniminato) titanium dichloride, cyclopentadienyl(1,3-bis[2,6-bis(1-methylethyl) phenyl]-2-imidazolidiniminato) titanium dichloride, pentafluorophenylcyclopentadienyl(1,3-bis(1,1-dimethylethyl)-2-imidazolidiniminato) titanium dichloride, pentafluorophenylcyclopentadienyl(1,3-dicyclohexyl-2-imidazolidiniminato) titanium dichloride, pentafluorophenylcyclopentadienyl(1,3-bis[2,6-bis(1-methylethyl)phenyl]-2-imidazolidiniminato) titanium dichloride, pentamethylcyclopentadienyl(di-t-butylketimino) titanium dichloride, pentamethylcyclopentadienyl(2,2,4,4-tetramethyl-3-pentaniminato) titanium dichloride, [(3a,4,5,6,6a-η)-2,4,5,6-tetramethyl-3aH-cyclopenta [b]thien-3a-yl](2,2,4,4-tetramethyl-3-pentaniminato) titanium dichloride, cyclopentadienyl(N,N-bis(1-methylethyl)benzenecarboximidamidato) titanium dichloride, pentafluorophenylcyclopentadienyl(N,N-bis(1-methylethyl) benzenecarboximidamidato) titanium dichloride, pentamethylcyclopentadienyl(N, N-bis(1-methylethyl)benzenecarboximidamidato) titanium dichloride, cyclopentadienyl(2,6-difluoro-N,N-bis(1-methylethyl)benzenecarboximidamidato) titanium dichloride, pentafluorophenylcyclopentadienyl(2,6-difluoro-N,N-bis(1-methylethyl)benzenecarboximidamidato) titanium dichloride, pentamethylcyclopentadienyl(2,6-difluoro-N, N-bis(1-methylethyl)benzenecarboximidamidato) titanium dichloride, cyclopentadienyl(N,N-dicyclohexyl-2,6-difluorobenzenecarboximidamidato) titanium dichloride, pentafluorophenylcyclopentadienyl(N,N-dicyclohexyl-2,6-difluorobenzenecarboximidamidato) titanium dichloride, pentamethylcyclopentadienyl(N, N-dicyclohexyl-2,6-difluorobenzenecarboximidamidato) titanium dichloride, cyclopentadienyl(N,N,N',N'-tetramethylguanidinato) titanium dichloride, pentafluorophenylcyclopentadienyl(N,N, N',N'-tetramethylguanidinato) titanium dichloride, pentamethylcyclopentadienyl(N,N,N',N'-tetramethylguanidinato) titanium dichloride, pentamethylcyclopentadienyl(1-(imino) phenylmethyl)piperidinato) titanium dichloride, pentamethylcyclopentadienyl chromium dichloride tetrahydrofuran complex.

Non-limiting examples of titanium (IV) dichloride metal catalyst suitable for use in the present invention are: (N-t-butylamido)(dimethyl)(tetramethylcyclopentadienyl)silane titanium dichloride, (N phenylamido)(dimethyl)(tetramethylcyclopentadienyl) silane titanium dichloride, (N sec-butylamido)(dimethyl)(tetramethylcyclopentadienyl)silane titanium dichloride, (N sec-dodecylamido) (dimethyl) (fluorenyl)silane titanium dichloride, (3 phenylcyclopentadien-1-yl) dimethyl(t-butylamido) silane titanium dichloride, (3 (pyrrol-1-yl)cyclopentadien-1-yl) dimethyl(t-butylamido)silane titanium dichloride, (3,4-diphenylcyclopentadien-1-yl)dimethyl(t-butylamido) silane titanium dichloride, 3 (3-N,N-dimethylamino)phenyl) cyclopentadien-1-yl)dimethyl(t-butylamido) silane titanium dichloride, (P-t-butylphospho)(dimethyl) (tetramethylcyclopentadienyl) silane titanium dichloride. Other examples are the metal catalyst precursor cited in the list directly above wherein Ln is dimethyl, dibenzyl, diphenyl, 1,4-diphenyl-2-butene-1,4-diyl, 1,4-dimethyl-2-butene-1,4-diyl or 2,3-dimethyl-2-butene-1,4-diyl.

Suitable metal catalyst precursors can be also the trivalent transition metal as those described in WO 9319104 (for example see especially example 1, page 13, line 15).

Suitable metal catalyst precursors can be also the trivalent transition metal as [C5Me4CH2CH2N(n-Bu)2]TiCl2 described in WO 9613529 (for example see especially example lll, page 20, line 10-13) or [C5H(iPr) 3CH2CH2NMe2]TiCl2 described in WO 97142232 and WO 9742236 (for example see especially example 1, page 26, line 14).

In an embodiment, the metal catalyst precursor is [C5H4CH2CH2NMe2]TiCl2;

In an embodiment, the metal catalyst or metal catalyst precursor may also be [C5Me4CH2CH2NMe2]TiCl2, [C5H4CH2CH2NiPr2]TiCl2, [C5Me4CH2CH2NiPr2] TiCl2, [C5H4C9H6N]TiCl2, [C5H4CH2CH2NMe2]CrCl2, [C5Me4CH2CH2NMe2]CrCl2; [C5H4CH2CH2NiPr2] CrCl2, [C5Me4CH2CH2NiPr2]CrCl2 or [C5H4C9H6N] CrCl2.

A non-limiting list of examples of metal catalyst precursors that would be suitable according to the present invention are: (N,N dimethylamino)methyl-tetramethylcyclopentadienyl titanium dichloride, (N,N dimethylamino)ethyl-tetramethylcyclopentadienyl titanium dichloride, (N,N dimethylamino)propyl-tetramethylcyclopentadienyl titanium dichloride, (N,N dibutylamino)ethyl-tetramethylcyclopentadienyl titanium dichloride, (pyrrolidinyl)ethyl-tetramethylcyclopentadienyl titanium dichloride, (N,N-dimethylamino)ethyl-fluorenyl titanium dichloride, (bis(1-methyl-ethyl)phosphino)ethyl-tetramethylcyclopentadienyl titanium dichloride, (bis(2-methyl-propyl)phosphino)ethyl-tetramethylcyclopentadienyl titanium dichloride, (diphenylphosphino)ethyl-tetramethylcyclopentadienyl titanium dichloride, (diphenylphosphino)methyldimethylsilyl-tetramethylcyclopentadienyl titanium dichloride. Other examples are the catalysts cited in the list directly above wherein Ln wherein the chloride can be replaced with bromide, hydride, methyl, benzyl, phenyl, allyl, (2-N,N-dimethylaminomethyl)phenyl, (2-N,N-dimethylamino)benzyl, 2,6-dimethoxyphenyl, pentafluorophenyl, and/or wherein the metal is trivalent titanium or trivalent chromium.

In a preferred embodiment, the catalyst precursor is: [2-(2,4,6-iPr3-C6H2)-6-(2,4,6-iPr3-C6H2)-C5H3N]Ti (CH2Ph)3 or [Et2NC(N-2,6-iPr2-C6H3)2]TiCl3 Other non-limiting examples of metal catalyst precursors according to the present invention are: {N',N''-bis[2,6-di(1-methylethyl)phenyl]-N,N-diethylguanidinato} titanium trichloride, {N', N''bis[2,6-di(1-methylethyl)phenyl]-N-methyl-N-cyclohexylguanidinato} titanium trichloride, {N',N''-bis[2,6-di(1-methylethyl)phenyl]-N,N-pentamethyleneguanidinato} titanium trichloride, {N',N''-bis[2,6-di(methyl)phenyl]-sec-butyl-aminidinato} titanium trichloride, {N-trimethylsilyl, N'—(N'',N''-dimethylaminomethyl)benzamidinato} titanium dichloride THF complex, {N-trimethylsilyl,N'—(N'', N''-dimethylaminomethyl)benzamidinato} vanadium dichloride THF complex, {N,N'-bis(trimethylsilyl)benzamidinato} titanium dichloride THF complex, {N,N'-bis(trimethylsilyl)benzamidinato} vanadium dichloride THF complex.

In a preferred embodiment, the catalyst precursor can be for example [C5H3N{CMe=N(2,6-iPr2C6H3)}2]FeCl2, [2,4-(t-Bu)2,-6-(CH=NC6F5)C6H2O]2TiCl2 or bis[2-(1,1-dimethylethyl)-6-[(pentafluorophenylimino)methyl] phenolato] titanium dichloride. Other non-limiting examples of metal catalyst precursors according to the present invention can be for example: bis[2-[(2-pyridinylimino)methyl]phenolato]titanium dichloride, bis[2-(1,1-dimethylethyl)-6-[(phenylimino)methyl]phenolato]titanium dichloride, bis[2-(1,1-dimethylethyl)-6-[(1-naphthalenylimino)methyl] phenolato] titanium dichloride, bis[3-[(phenylimino)methyl][1,1'-biphenyl]-2-phenolato] titanium dichloride, bis [2-(1,1-dimethylethyl)-4-methoxy-6-[(phenylimino)methyl] phenolato] titanium dichloride, bis[2,4-bis(1-methyl-1-phenylethyl)-6-[(phenylimino)methyl]phenolato] titanium dichloride, bis[2,4-bis(1,1-dimethylpropyl)-6-[(phenylimino)methyl]phenolato] titanium dichloride, bis[3-(1,1-dimethylethyl)-5-[(phenylimino)methyl][1,1'-biphenyl]-4-phenolato] titanium dichloride, bis[2-[(cyclohexylimino)methyl]-6-(1,1-dimethylethyl)phenolato] titanium dichloride, bis[2-(1,1-dimethylethyl)-6-[[[2-(1-methylethyl)phenyl]imino]methyl]phenolato] titanium dichloride, bis[2-(1,1-dimethylethyl)-6-[(pentafluorophenylimino)ethyl]phenolato] titanium dichloride, bis[2-(1,1-dimethylethyl)-6-[(pentafluorophenylimino)propyl]phenolato] titanium dichloride, bis[2,4-bis(1,1-dimethylethyl)-6-[1-(phenylimino)ethyl]phenolato] titanium dichloride, bis[2,4-bis(1,1-dimethylethyl)-6-[1-(phenylimino)propyl]phenolato] titanium dichloride, bis[2,4-bis(1,1-dimethylethyl)-6-[phenyl(phenylimino)methyl]phenolato] titanium dichloride. Other examples are the metal catalyst precursor cited in the list directly above wherein the dichloride can be replaced with dimethyl, dibenzyl, diphenyl, 1,4-diphenyl-2-butene-1, 4-diyl, 1,4-dimethyl-2-butene-1,4-diyl or 2,3-dimethyl-2-butene-1,4-diyl; and/or wherein the metal may be zirconium or hafnium.

In a preferred embodiment, the catalyst precursor can be: [2-[[[2-[[[3,5-bis(1,1-dimethylethyl)-2-(hydroxy-KO)phenyl]methyl]amino-κN]ethyl]methylamino-κN]methyl]-4,6-bis(1,1-dimethylethyl)phenolato(2–)-κO] titanium bis(phenylmethyl), [2,4-dichloro-6-[[[2-[[[3,5-dichloro-2-(hydroxy-KO)phenyl]methyl]amino-κN]ethyl]methylamino-κN]methyl]phenolato(2–)-κO] titanium bis(phenylmethyl), [2-[[[1-[[2-(hydroxy-KO)-3,5-diiodophenyl]methyl]-2-pyrrolidinyl-κN]methyl]amino-κN]methyl]-4-methyl-6-tricyclo[3.3.1.13,7]dec-1-ylphenolato(2–)-κO] titanium bis(phenylmethyl), [2-[[[2-[[[[2-(hydroxy-KO)-3,5-bis(1-methyl-1-phenylethyl)phenyl]methyl]methylamino-κN]methyl]phenyl] methylamino-κN]methyl]-4,6-bis(1-methyl-1-phenylethyl) phenolato(2–)-κO] titanium bis(phenylmethyl), [2,4-dichloro-6-[[[2-[[[[3,5-dichloro-2-(hydroxy-KO)phenyl] methyl]amino-κN]methyl]phenyl]amino-κN]methyl] phenolato(2–)-κO] titanium bis(phenylmethyl). Other examples are the metal catalyst precursor cited in the list directly above wherein bis(phenylmethyl) can be replaced with dichloride, dimethyl, diphenyl, 1,4-diphenyl-2-butene-1,4-diyl, 1,4-dimethyl-2-butene-1,4-diyl or 2,3-dimethyl-2-butene-1,4-diyl; and/or wherein the metal may be zirconium or hafnium.

A non-limiting list of examples of chromium catalysts that would be suitable for use in to the present invention are: (N-t-butylamido)(dimethyl)(tetramethylcyclopentadienyl) silane chromium bis(trimethylsilyl)methyl, (N-phenylamido)(dimethyl)(tetramethylcyclopentadienyl) silane chromium bis(trimethyl)methyl, (N-sec-butylamido)(dimethyl) (tetramethylcyclopentadienyl)silane chromium bis(trimethylsilyl)methyl, (N-sec-dodecylamido)(dimethyl)(fluorenyl)silane chromium hydride triphenylphosphine, (P-t-butylphospho)(dimethyl)(tetramethylcyclopentadienyl) silane chromium bis(trimethylsilyl)methyl. Other examples are the catalysts cited in the list directly above wherein L1 is hydride, methyl, benzyl, phenyl, allyl, (2-N,N-dimethylaminomethyl)phenyl, (2-N,N-dimethylamino)benzyl; in other words chromium methyl, chromium benzyl, chromium allyl, chromium (2-N,N-dimethylamino)benzyl; and/or wherein the metal is trivalent yttrium or samarium; Other examples are metal catalyst precursors as cited in the list directly above wherein Ln is chloride, bromide, hydride, methyl, benzyl, phenyl, allyl, (2-N,N-dimethylaminomethyl)phenyl, (2-N,N-dimethylamino)benzyl and/or wherein the metal is trivalent titanium or trivalent chromium.

Non-limiting examples of metal catalyst precursors according to the present invention are: N,N'-1,2-acenaphthylenediylidenebis(2,6-bis(1-methylethyl)benzenamine) nickel dibromide, N,N'-1,2-ethanediylidenebis(2,6-dimethylbenzenamine) nickel dibromide, N,N'-1,2-ethanediylidenebis(2,6-bis(1-methyl-ethyl)benzenamine) nickel dibromide, N,N'-1,2-acenaphthylenediylidenebis(2,6-dimethylbenzenamine) nickel dibromide, N,N'-1,2-acenaphthylenediylidenebis(2,6-bis(1-methylethyl) benzenamine) nickel dibromide, N,N'-1,2-acenaphthylenediylidenebis(1,1'-biphenyl)-2-amine nickel dibromide. Other examples are the catalysts cited in the list directly above wherein bromide can be replaced with chloride, hydride, methyl, benzyl and/or the metal can be palladium.

Further non-limiting examples of metal catalyst precursors according to the present invention are: [2-[[[2,6-bis(1-methylethyl)phenyl]imino-κN]methyl]-6-(1,1-dimethylethyl)phenolato-κO] nickel phenyl(triphenylphosphine), [2-[[[2,6-bis(1-methylethyl)phenyl]imino-κN]methyl]-6-(1,1-dimethylethyl)phenolato-κO] nickel phenyl (triphenylphosphine), [2-[[[2,6-bis(1-methylethyl)phenyl] imino-κN]methyl]phenolato-κO] nickel phenyl (triphenylphosphine)-, [3-[[[2,6-bis(1-methylethyl)phenyl] imino-κN]methyl][1,1'-biphenyl]-2-olato-κO] nickel phenyl (triphenylphosphine)-, [2-[[[2,6-bis(1-methylethyl)phenyl] imino-κN]methyl]-4-methoxyphenolato-κO] nickel phenyl (triphenylphosphine), [2-[[[2,6-bis(1-methylethyl)phenyl] imino-κN]methyl]-4-nitrophenolato-κO] nickel phenyl (triphenylphosphine), [2,4-diiodo-6-[[[3,3'',5,5''-tetrakis (trifluoromethyl)[1,1':3',1''-terphenyl]-2'-yl]imino-κN] methyl]phenolato-κO]nickel methyl[[3,3',3''-(phosphinidyne-κP)tris[benzenesulfonato]]] trisodium; [2,4-diiodo-6-[[[3,3'',5,5''-tetrakis(trifluoromethyl)[1,1':3', 1''-terphenyl]-2'-yl]imino-κN]methyl]phenolato-κO] nickel methyl[[3,3'-(phenylphosphinidene-κP)bis[benzenesulfonato]]]-disodium.

Co-Catalysts Suitable for Step A)

A co-catalyst can be used when a metal catalyst precursor is applied. The function of this co-catalyst is to activate the metal catalyst precursor. Co-catalysts may be selected for example from the group consisting of aluminum alkyls and aluminum alkyl halides, such as for example triethyl aluminum (TEA) or diethyl aluminum chloride (DEAC), MAO, DMAO, MMAO, SMAO, possibly in combination with aluminum alkyls, for example triisobutyl aluminum, and/or with a combination of an aluminum alkyl, for example triisobutyl aluminum, and a fluorinated aryl borane or fluorinated aryl borate (viz. B(R')$_y$ wherein R' is a fluorinated aryl and y is 3 or 4, respectively). Examples of a fluorinated borane is B(C$_6$F$_5$)$_3$ and of fluorinated borates are [X]$^+$[B (C$_6$F$_5$)$_4$]$^-$ (e.g. X=Ph$_3$C, C$_6$H$_5$N(H)Me$_2$).

Methylaluminoxane or MAO as used in the present description may mean: a compound derived from the partial hydrolysis of trimethyl aluminum that serves as a co-catalyst for catalytic olefin polymerization.

Supported methylaluminoxane or SMAO as used in the present description may mean: a methylaluminoxane bound to a solid support.

Depleted methylaluminoxane or DMAO as used in the present description may mean: a methylaluminoxane from which the free trimethyl aluminum has been removed.

Modified methylaluminoxane or MMAO as used in the present description may mean: modified methylaluminoxane, viz. the product obtained after partial hydrolysis of trimethyl aluminum plus another trialkyl aluminum such as tri(isobutyl) aluminum or tri-n-octyl aluminum.

Fluorinated aryl borates or fluorinated aryl boranes as used in the present description may mean: a borate compound having three or four fluorinated (preferably perfluorinated) aryl ligands or a borane compound having three fluorinated (preferably perfluorinated) aryl ligands.

For example, the co-catalyst can be an organometallic compound. The metal of the organometallic compound can be selected from Group 1, 2, 12 or 13 of the IUPAC Periodic Table of Elements. Preferably, the co-catalyst is an organoaluminum compound, more preferably an aluminoxane, said aluminoxane being generated by the reaction of a trialkyl aluminum compound with water to partially hydrolyze said aluminoxane. For example, trimethyl aluminum can react with water (partial hydrolysis) to form methylaluminoxane (MAO). MAO has the general formula (Al(CH$_3$)$_{3-n}$O$_{0.5n}$)$_x$. (AlMe$_3$)$_y$, having an aluminum oxide framework with methyl groups on the aluminum atoms.

MAO generally contains significant quantities of free trimethyl aluminum (TMA), which can be removed by drying the MAO to afford the so-called depleted MAO or DMAO. Supported MAO (SMAO) may also be used and may be generated by the treatment of an inorganic support material, typically silica, by MAO.

Alternatively to drying the MAO, when it is desired to remove the free trimethyl aluminum, a bulky phenol such as butylhydroxytoluene (BHT, 2,6-di-t-butyl-4-methylphenol) can be added which reacts with the free trimethyl aluminum.

Neutral Lewis acid modified polymeric or oligomeric aluminoxanes may also be used, such as alkylaluminoxanes modified by addition of a C1-30 hydrocarbyl substituted Group 13 compound, especially a tri(hydrocarbyl) aluminum- or tri(hydrocarbyl) boron compounds, or a halogenated (including perhalogenated) derivatives thereof, having 1 to 10 carbons in each hydrocarbyl or halogenated hydrocarbyl group, more especially a trialkyl aluminum compound.

Other examples of polymeric or oligomeric aluminoxanes are tri(isobutyl) aluminum- or tri(n-octyl) aluminum-modified methylaluminoxane, generally referred to as modified methylaluminoxane, or MMAO. In the present invention, MAO, DMAO, SMAO and MMAO may all be used as co-catalyst.

In addition, for certain embodiments, the metal catalyst precursors may also be rendered catalytically active by a combination of an alkylating agent and a cation forming agent which together form the co-catalyst, or only a cation forming agent in the case the catalyst precursor is already alkylated, as exemplified in T. J. Marks et al., Chem. Rev. 2000, (100), 1391. Suitable alkylating agents are trialkyl aluminum compounds, preferably TIBA. Suitable cation forming agents for use herein include (i) neutral Lewis acids, such as C1-30 hydrocarbyl substituted Group 13 compounds, preferably tri(hydrocarbyl)boron compounds and halogenated (including perhalogenated) derivatives thereof, having from 1 to 10 carbons in each hydrocarbyl or halogenated hydrocarbyl group, more preferably perfluorinated tri(aryl)boron compounds, and most preferably tris(pentafluorophenyl) borane, (ii) non polymeric, compatible, non-coordinating, ion forming compounds of the type [C]$^+$[A]$^-$ where "C" is a cationic group such as ammonium, phosphonium, oxonium, silylium or sulfonium groups and [A]$^-$ is an anion, especially for example a borate.

Non-limiting examples of the anionic ["A"] are borate compounds such as C1-30 hydrocarbyl substituted borate compounds, preferably tetra(hydrocarbyl)boron compounds and halogenated (including perhalogenated) derivatives thereof, having from 1 to 10 carbons in each hydrocarbyl or halogenated hydrocarbyl group, more preferably perfluorinated tetra(aryl)boron compounds, and most preferably tetrakis(pentafluorophenyl) borate.

A supported catalyst may also be used, for example using SMAO as the co-catalyst. The support material can be an inorganic material. Suitable supports include solid and particulated high surface area, metal oxides, metalloid oxides, or mixtures thereof. Examples include: talc, silica, alumina, magnesia, titania, zirconia, tin oxide, aluminosilicates, borosilicates, clays, and mixtures thereof.

Preparation of a supported catalyst can be carried out using methods known in the art, for example i) a metal catalyst precursor can be reacted with supported MAO to produce a supported catalyst; ii) MAO can be reacted with a metal catalyst precursor and the resultant mixture can be added to silica to form the supported catalyst; iii) a metal catalyst precursor immobilized on a support can be reacted with soluble MAO.

Scavengers Suitable for Step A)

A scavenger can optionally be added in the catalyst system in order to react with impurities that are present in the polymerization reactor, and/or in the solvent and/or monomer feed. This scavenger prevents poisoning of the catalyst during the olefin polymerization process. The scavenger can be the same as the co-catalyst but can also independently be selected from the group consisting of aluminum hydrocarbyls (e.g. triisobutyl aluminum, trioctyl aluminum, trimethyl aluminum, MAO, MMAO, SMAO), zinc hydrocarbyls (e.g. diethyl zinc) or magnesium hydrocarbyls (e.g. dibutyl magnesium).

Polymerization of the Olefins

Step A) is a step of polymerizing at least two types of olefins to provide a copolymerized polyolefin main chain and this step is preferably carried out in an inert atmosphere.

In the present invention the heteroatom-containing functions on the second type of olefin monomer are in situ protected or pacified by a pacifying metal.

Polymerization of the olefins can for example be carried out in the gas phase below the melting point of the polymer. Polymerization can also be carried out in the slurry phase below the melting point of the polymer. Moreover, polymerization can be carried out in solution at temperatures above the melting point of the polymer product.

It is known to continuously polymerize one or more olefins, such as ethylene or propylene, in solution or in slurry, e.g. in a continuous (multi) CSTR or (multi) loop reactor, in the gas-phase in a reactor with a fluidized or mechanically stirred bed or in a combination of these different reactors, in the presence of a catalyst based on a compound of a transition metal belonging to Groups 3 to 10 of the Periodic Table of the Elements.

For the gas phase process, the polymer particles are kept in the fluidized and/or stirred state in a gaseous reaction mixture containing the olefin(s). The catalyst is introduced continuously or intermittently into the reactor while the polymer constituting the fluidized or mechanically stirred bed is withdrawn from the reactor, also continuously or intermittently. The heat of the polymerization reaction is essentially removed by the gaseous reaction mixture, which passes through heat transfer means before being recycled into the reactor. In addition, a liquid stream may be introduced into the gas-phase reactor to enhance heat removal.

Slurry phase polymerization of olefins is very well known, wherein an olefin monomer and optionally olefin comonomer are polymerized in the presence of a catalyst in a diluent in which the solid polymer product is suspended and transported. Two or more reactors are typically used in such polymerizations when it is desired to produce a multimodal product, in which a polymer made in a first reactor is transferred to a second reactor, where a second polymer having different properties to the first polymer is made in the presence of the first. However, it may also be desirable to connect two reactors making monomodal polymers in order to create a swing monomodal/multimodal plant or to increase the flexibility of two small reactors that individually may lack the scale to be economically viable. A slurry reactor may also be combined with a gas phase reactor.

Slurry phase polymerizations are typically carried out at temperatures in the range 50-125° C. and at pressures in the range 1-40 bar. The catalyst used can be any catalyst typically used for olefin polymerization such as those according to the present invention. The product slurry, comprising polymer and diluent and in most cases also components of the catalyst system, olefin monomer and comonomer can be discharged from each reactor intermittently or continuously, optionally using concentrating devices such as hydrocyclones or settling legs to minimize the quantity of fluids withdrawn with the polymer.

The present invention may also be carried out in a solution polymerization process. Typically, in the solution process, the monomers and polymer are dissolved in an inert solvent.

Solution polymerization has some advantages over slurry processes. The molecular weight distribution and the process variables are more easily controlled because the polymerization occurs in a homogeneous phase using homogeneous single-site catalysts (viz. metal catalysts or metal catalyst precursors consisting of solely one type of catalytically active site). The high polymerization temperature typically above 150° C. also leads to high reaction rates. The solution process is used primarily for the production of relatively low molecular weight and/or low density resins, which are difficult to manufacture by the liquid slurry or gas phase processes. The solution process is very well suited to produce low density products but it is thought much less satisfactory for higher molecular weight resins because of the excessive viscosity in the reactor as discussed by Choi and Ray, JMS Review Macromolecular Chemical Physics C25(I), 1-55, pg. 10 (1985).

Unlike in the gas phase or slurry process, in a solution process there is usually no polymer solid or powder formed. Typically, the reaction temperature and the reaction pressure are higher than in gas phase or slurry process to maintain the polymer in solution. The solution process tends to use an inert solvent that dissolves the polymer as it is formed, subsequently the solvent is separated and the polymer is pelletized.

The solution process is considered versatile in that a wide spectrum of product properties can be obtained by varying the composition of the catalyst system, the pressure, the temperature and the comonomer employed.

Since relatively small reactors are used for a solution process, the, residence time is short and grade changeover can be rapid. For example two reactors in series operated at pressures of up to 50 bar and temperatures up to 250° C. in the reactor can be used. Fresh and recycled olefin monomer is compressed up to 55 bar and pumped into the polymerization reactor by a feed pump. The reaction is adiabatic and maintained at a maximum reactor outlet of about 250° C. Although a single reactor can be used, multiple reactors provide a narrower residence time distribution and therefore a better control of molecular weight distribution.

In one embodiment of the invention, the product obtained after step A) can be premixed with a catalyst to be used in step B) prior to step B)

Step B) Forming of Polymer Side Chains

As discussed above, the graft copolymer is formed during step B). Step B) is hence a step of forming the polymer side chains on the one or multiple metal-pacified functionalized short chain branches to obtain the graft copolymer. In other words, step B) relates to the formation of the polymer side chains, viz. the polymer branches, viz. the graft copolymer. This can be carried out e.g. by ROP. This can also be carried out by means of a nucleophilic substitution reaction with a pre-synthesized polymer containing carbonyl group-containing functionalities (e.g. carboxylic or carbonic acid ester functionalities). The polymer branches can thereby also be random or block copolymers.

In case during step B) polar polymer side chains are introduced, the polarity of these may be tuned by e.g. by adding during step B) the combination of multiple cyclic monomers of different polarity, by using a pre-synthesized homopolymer or copolymer with a tuned polarity that can be attached to the polyolefin main chain via ROP and/or nucleophilic substitution by adding during step B) a combination of multiple polymers of different polarity or at least two different cyclic monomers, or by adding during step B) a combination of at least one cyclic monomer and at least one polymer that can be attached to the polyolefin main chain via nucleophilic substitution.

Alternatively, the polarity of the polymer side chains may be tuned by reacting the polyolefin having metal-pacified side groups obtained in step A) with a combination of a cyclic monomer and a pre-synthesized polymer for the side chains. Both the physical and mechanical properties may be tuned using the process according to the present invention. In addition, the hydrolysis and degradation properties of the polar polymer side chains may be tuned while not affecting the polyolefin main chain.

In case during step B) polyethylene-like polyester side chains are introduced, the copolymers obtained may be used as compatibilizers for polyolefin-PE blends, in particular iPP-PE blends.

In case of a grafting onto approach in step B), the polymers added to be grafted onto the main chain comprise carbonyl group-containing functionalities, for example carboxylic or carbonic acid ester functionalities. It is possibly that said polymer side chains are random copolymers or block copolymers.

In this manner a plurality of polymer blocks or chains are linked to said polyolefin main chain comprising the reactive functionalities. In an embodiment, all of the polymer side chains are made of the same monomer(s) but may vary in average molecular weight. By tuning the reactivity and amount of the polymer branches the properties of the graft copolymer obtained can be easily tuned. In an embodiment, the polymer side chains are homopolymers, preferably polar polymers such as polyesters. The polymer side chains may also be random copolymers or block copolymers. The side chains may be all the same or may be different.

In a specific embodiment, the process according to the present invention consists of two successive steps comprising copolymerizing an olefin, such as ethylene, with a metal-pacified functional olefin as comonomer, such as an aluminum-pacified functional (preferably a hydroxyl functionality) olefin, and in a following step, the addition of cyclic monomers, e.g. lactones, to initiate the ROP. An advantage of the present process is that no additional catalyst is needed to catalyze the ROP, since the initiator is a catalytic initiator functioning as both the initiator and the catalyst. The product of the first step (step A) is a polyolefin having metal-pacified side groups. Each of said metal-pacified side groups can act as a ROP initiator and catalyst in step B) to provide the graft copolymer.

In a specific embodiment, the process according to the present invention consists of two successive steps, the first step being copolymerizing an olefin, such as ethylene, with a metal-pacified functional olefin as comonomer, such as an aluminum-pacified functional (preferably a hydroxyl functionality) olefin, and the subsequent step being attaching polymers comprising reactive carbonyl-containing functionalities as side chains.

An advantage of the present process is that no additional catalyst is needed to carry out the ROP or other carbonylic nucleophilic substitution reaction. The product of the first step (step A) is a polyolefin having metal-pacified side groups. Each of said metal-pacified side groups can initiate and catalyze ROP, a transesterification reaction or another carbonylic nucleophilic substitution reaction in step B) to provide the graft copolymer. Step B) is preferably carried out in an inert atmosphere.

A polyolefin main chain having one or multiple metal-pacified functionalized short chain branches, obtained by copolymerizing at least one first type of olefin monomer and at least one second type of metal-pacified functionalized olefin monomer using a catalyst system in step A), may thus be used to initiate and/or catalyze and/or carry out ROP and/or a transesterification reaction and/or another carbonylic nucleophilic substitution reaction in step B). This may especially for example be possible using an aluminum-alkyl to pacify and/or to obtain the at least one second type of metal-pacified functionalized olefin monomer, so that at least one second type of metal-pacified functionalized olefin monomer bears/comprises an aluminum-alkyl.

Ring-Opening Polymerization Reaction to Grow Polymer Branches

During step B) of the inventive process the polymer side chains may be formed by ROP of cyclic monomers.

The result of step A) is a polyolefin having one or multiple metal-pacified functionalized short side chain branches. These metal-pacified functionalized short side chain branches can be used to initiate ROP.

The cyclic monomers as preferably used by the present invention are oxygen-containing cyclic compounds. The mechanism of ROP is well known to a skilled person and described for example in the Handbook of Ring-Opening Polymerization, 209, Eds. P. Dubois, O. Coulembier, J.-M. Raquez, Wiley VCH, ISBN: 9783527319534.

A mixture of cyclic monomer may also be used to form random polymer side chains to tune the properties. Also the sequential addition of different cyclic monomers may be used.

The main advantage of the present method is that no additional catalyst is required to be added. The metal-pacified functionalized short chain branches that are obtained in step A) are the reactive substituents to be used in step B).

In the prior art, usually after preparation of the polyolefin main chain, the metal-pacified reactive side chains are hydrolyzed to OH groups. To these OH groups, usually an aluminum center is added using e.g. triethyl aluminum. This will lead to an Al—O—Pol species that will initiate the ROP. However, these extra steps are not required when using the method according to the present invention.

In an embodiment, the cyclic monomer for use in ROP is a polar monomer. The polar cyclic monomer is preferably selected from the group consisting of a lactone, a lactide, a cyclic oligoester (e.g. a di-ester, a tri-ester, a tetra-ester, a penta-ester or higher oligoesters), an epoxide, an aziridine, a combination of epoxide and/or aziridine and $CO_2$, a cyclic anhydride, a combination of epoxide and/or aziridine and a cyclic anhydride, a combination of epoxide and/or aziridine and $CO_2$ and a cyclic anhydride, a cyclic N-carboxyanhydride, a cyclic carbonate, a lactam and one or more combinations thereof.

Lactone is used to prepare polylactone side chains; lactide is used to prepare polylactide side chains; cyclic oligoester (e.g. a di-ester, a tri-ester, a tetra-ester or a penta-ester) is used to prepare different types of polyester side chains; epoxide is used to prepare polyether side chains using ROP; a combination of epoxide and $CO_2$ is used to prepare polycarbonate side chains or polyca(rbonate-co-ether) side chains; a combination of epoxide and a cyclic anhydride is used to prepare polyester side chains or polyester-co-ether side chains; a combination of epoxide, cyclic anhydride and $CO_2$ is used to prepare poly(carbonate-co-ester) side chains or poly(carbonate-co-ester-co-ether) side chains; an N-carboxyanhydride is used to produce polypeptide side chains; a carbonate is used to prepare polycarbonate or polycarbonate-co-ether side chains.

Other cyclic monomers are cyclic sulfur-containing compounds such as sulfides; cyclic nitrogen-containing compounds such as amines (aziridines), lactams, urethanes, ureas; cyclic phosphorus-containing compounds such as phosphates, phosphonates, phosphites, phosphines and phosphazenes; and cyclic silicon-containing compounds such as siloxanes, and silyl ethers.

In an embodiment, the at least one cyclic monomer for use in ROP is a monomer selected from the group consisting of cyclic hydrocarbyls containing a reactive functionality that can undergo a nucleophilic substitution reaction at a carbonyl group-containing functionality, such as macrolactones or macrooligolactones, whereby the monomer comprises at least 10 consecutive carbon atoms in the ring/cycle.

In case the cyclic monomer is a cyclic ester, it may be a cyclic ester having a ring size from 4-40 atoms. Preferably the atoms forming the ring, other than the oxygen of the ester functionality or ester functionalities in the case of cyclic oligoesters, are carbon atoms.

A lactone is a cyclic compound having one ester group; a dilactone is a compound having two ester groups; a trilactone is a compound having three ester groups; a tetralactone is a compound having four ester groups; a pentalactone is a compound having five ester groups; an oligolactone is a compound having 2-20 ester groups.

Examples of cyclic esters that can be used as monomer in step B) include β-propiolactone, β-butyrolactone, 3-methyloxetan-2-one, γ-valerolactone, ε-caprolactone, ε-decalactone, 5,5-dimethyl-dihydro-furan-2-one, 1,4-dioxepan-5-one, 1,5-dioxepan-2-one, 3,6-dimethylmorpholine-2,5-dione, 1,4-dioxepan-7-one, 4-methyl-1,4-dioxepan-7-one, (S)-γ-hydroxymethyl-γ-butyrolactone, γ-octanoic lactone, γ-nonanoic lactone, δ-valerolactone, δ-hexalactone, δ-decalactone, δ-undecalactone, δ-dodecalactone, glycolide, lactide (L, D, meso), heptalactone, octalactone, nonalactone, decalactone, 11-undecalactone, 12-dodecalactone, 13-tridecalactone, 14-tetradecalactone, 15-pentadecalactone (or ω-pentadecalactone), globalide, 16-hexadecalactone, ambrettolide, 17-heptadecalactone, 18-octadecalactone, 19-nonadecalactone, ethylene brassylate, butylene brassylate, cyclic butyl terephthalate, cyclic butyl adipate, cyclic butyl succinate, cyclic butyl terephthalate oligomers.

The cyclic esters, in particular where these are lactones, may be in any isomeric form and may further contain organic substituents on the ring that do not prevent the ROP. Examples of such cyclic esters include 4-methyl caprolactone, ε-decalactone, the lactone of ricinoleic acid (a 10-membered ring with a hexyl branched on the (co-1)-position) or the hydrogenated version of thereof, 13-hexyloxacyclotridecan-2-one (a macrocycle with a hexyl branch on the α-position), and the like. These lactones in which there are at least 10 methylene units in the ring are considered in the context of the present invention to be a nonpolar monomer.

It is further possible that the cyclic ester comprise one or more unsaturations in the ring. Examples of such cyclic esters include 5-tetradecen-14-olide, 11-pentadecen-15-olide, 12-pentadecen-15-olide (also known as globalide), 7-hexadecen-16-olide (also known as ambrettolide) and 9-hexadecen-16-olide.

The cyclic ester may further have one or more heteroatoms in the ring, provided that such do not prevent the ROP. Examples of such cyclic esters include 1,4-dioxepan-5-one, 1,5-dioxepan-2-one, 3,6-dimethylmorpholine-2,5-dione, 1,4-oxazepan-7-one, 4-methyl-1,4-oxazepan-7-one, 10-oxahexadecanolide, 11-oxahexadecanolide, 12-oxahexadecanolide and 12-oxahexadecen-16-olide.

In an embodiment, first a nonpolar monomer is used to form a first polyethylene-like block in the polymer side chain and subsequently a polar monomer is used to form an additional block on the nonpolar block in the polymer side chain. In other words, the side chains in themselves are block-copolymers.

In an embodiment, the polyolefin is isotactic PP, the nonpolar polymer is a polyambrettolide or polypentadecalactone and the polar polymer is polycaprolactone or polylactide.

Nucleophilic Substitution to Add Polymer Side Chains

During step B) a nucleophilic substitution reaction can be carried out to add polymer side chains to the polyolefin main chain.

The result of step A) is a polyolefin having one or multiple metal-pacified functionalized short side chain branches. These metal-pacified functionalized short side chain branches can be used to carry out a nucleophilic substitution reaction.

In the context of the present invention, a nucleophilic substitution reaction describes the reaction of a nucleophile with a carbonyl group-containing functionality present in a polymer added during step B) to the polyolefin having one or multiple metal-pacified functionalized short side chain branches obtained in step A).

Combination of ROP and Nucleophilic Substitution to Add Polymer Side Chains

During step B) of the present process the polymer side chains may be formed by a combination of ROP of cyclic monomers, e.g. lactones, and nucleophilic substitution, e.g. transesterification.

The polymers comprising at least one carbonyl group-containing functionality to be added during step B) to afford the graft copolymer may for example be selected from the group consisting of a polyester, a polycarbonate, a polyamide, a polyurethane, a polyurea, a random or block poly(carbonate-ester), poly(carbonate-ether), poly(ester-ether), poly(carbonate-ether-ester), poly(ester-amide), poly(ester-ether-amide), poly(carbonate-amide), poly(carbonate-ether-amide), poly(ester-urethane), poly(ester-ether-urethane), poly(carbonate-urethane), poly(carbonate-ether-urethane), poly(ester-urea), poly(ester-ether-urea), poly(carbonate-urea), poly(carbonate-ether-urea), poly(ether-amide), poly(amide-urethane), poly(amide-urea), poly(urethane-urea) or one or more combination thereof.

In an embodiment, besides a pre-synthesized polymer for the side chains also cyclic monomers are added to provide a combination of ROP and nucleophilic substitution reactions to yield for example a final "polyolefin-g-polar polymer" or "polyolefin-g-polyethylene-like polymer" graft copolymer. This approach provides a versatile method to tune the physical and mechanical properties of the graft copolymer.

In an embodiment, a co-catalyst is present during step B) in case of nucleophilic substitution reaction. More preferably, when using a Cr- or Co-based catalyst and using epoxides and/or aziridines in combination with $CO_2$ or using epoxides and/or aziridines in combination with cyclic anhydrides or using epoxides and/or aziridines in combination with $CO_2$ and cyclic anhydrides. Examples of a co-catalyst suitable for use are N-methyl-imidazole, 4-dimethylanimopyridine, bis(triphenylphosphoranylidene)ammonium chloride) bis(triphenyl-phosphoranylidene)ammonium azide), tricyclohexylphosphine, triphenylphosphine, tris(2,4,6-trimethoxyphenyl)phosphine and 1,5,7-triazabicyclododecene.

The main advantage of the present method is that no additional catalyst for step B) is required to be added since the metal-pacified functionalized short chain branches that are obtained in step A) are the reactive substituents to be used in step B). However, it is possible to add an additional catalyst for the ROP, transesterification or nucleophilic substitution reaction. Specific examples of catalysts include among others mineral acids, organic acids, organic bases, metallic compounds such as hydrocarbyls, oxides, chlorides, carboxylates, alkoxides, aryloxides, amides, salen complexes, β-ketiminato complexes, guanidinato complexes of tin, titanium, zirconium, aluminum, bismuth, antimony, magnesium, calcium and zinc and lipase enzymes. Examples of suitable catalysts are as reported by J. Otera and J. Nishikido, Esterification, p. 52-99, Wiley 2010; *J. Otera Chem. Rev.* 1993, 93, 1449; H. Kricheldorf *Chem. Rev.* 2009, 109, 5579; D.-W. Lee, Y.-M. Park, K.-Y. Lee *Catal. Surv. Asia* 2009, 13, 63; A. B. Ferreira, A. L. Cardoso, M. J. da Silva *International Schilarity Research Network,* 2012, doi: 10.5402/2012/142857; Z. Helwani, M. R. Othman, \N. Aziz, J. Kim, W. J. N. Fernando *Appl. Catal. A: Gen.* 2009, 363, 1; N. E. Kamber, W. Jeong, R. M. Waymouth, R. C. Pratt, B. G. G. Lohmeijer, J. L. Hedrick, *Chem. Rev.,* 2007, 107, 5813; D. Bourissou, S. Moebs-Sanchez, B. Martin-Vaca, *C. R. Chimie,* 2007, 10, 775.

Examples of organic acid as catalysts for ROP or nucleophilic substitution according to the present invention are the following, an acid selected from the group comprising diethyl ether complex of hydrogen chloride, fluorosulfonic acid, trifluoromethanesulfonic acid, methyl trifluorosulfonate, ethyl trifluoromethane-sulfonate, n-propyl trifluorosulfonate and i-propyl trifluorosulfonate)), metal (yttrium, aluminum and bismuth) triflates, the acidic catalyst may also be selected from a group of compounds that are formed by combining a strong Lewis acid and a strong Brønsted acid. A specific example of such a compound is an equimolar combination of fluorosulfonic acid and antimony pentafluoride.

Examples of organic bases as catalysts for ROP or nucleophilic substitution according to the present invention are the following. The bases herein are defined as super bases and are referred as compounds which exhibit basicity significantly higher than that of commonly used amines such as pyridine or triethylamine. Super bases can broadly be divided into three categories: organic, organometallic and inorganic. Organic super bases comprise molecules characterized as amidines, guanidines, multicyclic polyamines and phosphazenes.

Amidines are classified as amine compounds which have an imine function adjacent to the α-carbon:

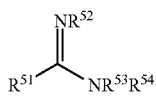

Structurally these correspond to amine equivalents of carboxylic esters. The alkyl substituents $R^{51}$-$R^{54}$ are independently selected from hydrogen and C1-C16 alkyl substituents that may be linear, branched, cyclic or aromatic. Further these alkyl substituents $R^{51}$-$R^{54}$ may be unsaturated, halogenated or carry a specific functionality such as hydroxyl, ether, amine, cyano, or nitro functions. The alkyl substituents $R^{51}$-$R^{54}$ may also form bicyclic structures, where an increased ring strain may lead to stronger basicity. Examples of cyclic amidines are 1,5-diazabicyclo[4.3.0] non-5-ene, 3,3,6,9,9-pentamethyl-2,10-diazabicyclo-[4.4.0] dec-1-ene, 1,8-diazabicyclo[5.4.0]undec-7-ene (DBU). DBU is considered to be the strongest amidine derivative.

Guanidines can similarly be classified as amines, which possess two imine functions adjacent to the α-carbon:

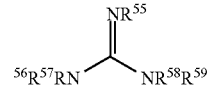

These correspond to amine equivalents of ortho esters and show the strongest Brønsted basicity among amine derivatives. The basicity of guanidine is close to that of a hydroxyl ion, which is the strongest base in aqueous chemistry. The alkyl substituents $R^{55}$-$R^{59}$ are independently selected from hydrogen and C1-C16 alkyl substituents that may be linear, branched, cyclic or aromatic. Further these alkyl substituents $R^{55}$-$R^{59}$ may be unsaturated, halogenated or carry a specific functionality such as hydroxyl, ether, amine, cyano, or nitro functions. The alkyl substituents $R^{55}$-$R^{59}$ may also form bicyclic structures, where an increased ring strain may lead to stronger basicity. Examples of common guanidines are 1,5,7-triazabicyclo[4.4.0]dec-5-ene (TBD), N-methyl-1,5,7-triazabicyclo[4.4.0]dec-5-ene (MTBD), N,N,N',N'-tetramethyl-guanidine (TMG), or N,N,N',N',N''-pentamethylguanidine (PMG) can be given as examples of guanidine compounds.

Phosphazenes are organic super bases containing a pentavalent phosphorus atom bonded to four nitrogen functions of three amine substituents and one imine substituent.

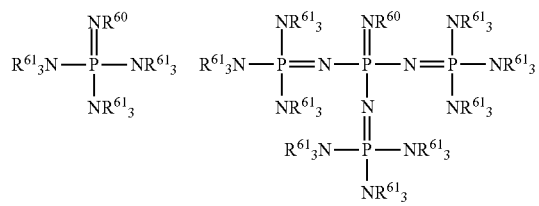

Phosphazenes are classified as $P_n$ bases, where n denotes the number of phosphorus atoms in the molecule. The basicity of phosphazenes increase with an increasing amount of phosphorous atoms in the molecule. A $P_4$ base is considered to have a basicity parallel to organolithium compounds. The alkyl substituents $R^{60}$-$R^{61}$ are independently selected from C1-C16 alkyl substituents that may be linear, branched, cyclic or aromatic. Further these alkyl substituents may be unsaturated, halogenated or carry a specific functionality such as hydroxyl, ether, amine, cyano, or nitro functions. The alkyl substituents R may be the same or mixtures of various combinations. Suitable examples of phosphazenes according to the present invention are 1-t-butyl-2,2,4,4,4-pentakis(dimethylamino)-2$A^5$,4$A^5$-catenadi(phosphazene) ($P_2$-t-Bu) and 1-t-butyl-4,4,4-tris(dimethylamino)-2,2-bis [tris(dimethylamino)-phosphoranylidenamino]-2$A^5$,4$A^5$-catenadi(phosphazene) ($P_4$-t-Bu).

Examples of organometallic or inorganic bases as catalysts for ROP or nucleophilic substitution according to the present invention are the following. Organometallic or inorganic super bases consist of metal alkyls, metal alkoxides and metal amides such as butyl lithium, potassium t-butoxide, lithium diisopropylamide and lithium bis(trimethylsilyl) amide to give an example of these. Mixtures of organometallic super bases can also be used to further enhance their reactivity; a mixture of butyl lithium and potassium t-butoxide an example of such. Inorganic super bases are frequently compounds with anions that are small in size and exhibit a high charge density such as metal hydrides in general and lithium nitride to give as examples.

Examples of tin-based catalysts for ROP or nucleophilic substitution according to the present invention are the following. Tetravalent tin compounds which are used as metal catalysts are tin oxide, dibutyltin dilaurate, dibutyltin diacetate, dibutyltin di(2-ethylhexoate), dioctyltin dilaurate, dibutyltin maleate, di(n-octyl)tin maleate, bis(dibutyl acetoxy tin) oxide, bis(dibutyl lauroxyloxy tin) oxide, dibutyltin dibutoxide, dibutyltin dimethoxide, dibutyltin disalicylate, dibutyltin bis(isooctyl maleate), dibutyltin bis(isopropyl maleate), dibutyltin oxide, tributyltin acetate, tributyltin isopropyl succinate, tributyltin linoleate, tributyltin nicotinate, dimethyltin dilaurate, dimethyltin oxide, dioctyltin oxide, bis(tributyltin) oxide, diphenyltin oxide, triphenyltin acetate, tripropyltin acetate, tripropyltin laurate, and bis(tripropyltin) oxide. Suitable tin-containing compounds include the carboxylate salts of divalent tin in which the carboxylate group is derived from a monobasic acid, an aliphatic dibasic acid, a tribasic aliphatic acid, a monobasic aromatic acid, a dibasic aromatic acid or a tribasic aromatic acid as hereinafter described in connection with the process for the production of esters. The carboxylate salt may be added as such or may be formed 'in situ' by reacting divalent tin oxide with a carboxylic acid. Divalent tin compounds, which are used are tin oxide, tin bis(2-ethyl-hexanonate), tin bis(2,6-tBu-4-Me-$C_6H_2O$), tin oxalate, tin dichloride.

Examples of titanium-based catalysts for ROP or nucleophilic substitution according to the present invention are the following. Titanium compounds which can be employed include tetramethyl titanate, tetraethyl titanate, tetraallyl titanate, tetrapropyl titanate, tetraisopropyl titanate, tetrabutyl titantate, tetraisobutyl titanate, tetraamyl titanate, tetracyclopentyl titanate, tetrahexyl titanate, tetracyclohexyl titanate, tetrabenzyl titanate, tetraoctyl titanate, tetra(2-ethyl-hexyl) titanate, tetranonyl titanate, tetradecyl titanate, and tetraoleyl titanate, tetraphenyl titanate, tetra(o-tolyl) titanate and tetra(m-tolyl) titanate, and tetra(1-naphthyl) titanate and tetra(2-naphthyl) titanate. Mixed alkyl titanate compounds would include trimethyl butyl titanate, dimethyl dibutyl titanate, triethyl butyl titanate, methyl isopropyl dibutyl titanate, diethyl dibutyl titanate, propyl tributyl titanate, ethyl tricyclohexyl titanate, diisopropyl dioctadecyl titanate, and dibutyl dioctadecyl titanate.

Examples of bismuth-based catalysts for ROP, transesterification or nucleophilic substitution according to the present invention are the following. Bismuth tris(2-ethylhexanoate), bismuth trisacetate, bismuth trishexanoate, bismuth tristriflate, bismuth subsalicylate (also called orthosalicylate), bismuth subcarbonate, $BiCl_3$, $BiBr_3$, $BiI_3$, $Bi_2O_3$, $Ph_2BiOEt$, $Ph_2BiOMe$, $Ph_2BiOtBu$, $Ph_2BiOBr$, $Ph_2BiI$, $[SCH_2CH_2O]Bi[SCH_2CH_2OH]$, $B(OEt)_3$, bismuth aminotriethanolate, bismuth lactate, bismuth nitrate, bismuthyl nitrate, bismuth carbonate, bismuthyl carbonate, bismuthyl hydroxide, bismuth ortho hydroxide ($Bi(OH)_3$).

Examples of organometallic/metal coordination complexes for use as catalysts for ROP, transesterification or nucleophilic substitution according to the present invention are the following. Besides metal halide, triflate, hydrocarbyl, alkoxide, aryloxide, amide, carboxylate, acetylacetonate complexes or complexes consisting of combinations of these constituents of Li, Na, K, Mg, Ca, Sc, Y, lanthanides, Ti, Zr, Zn, Al, Ga, Bi and Sn, distinct and well-defined organometallic and metal coordination complexes have been applied as metal catalysts for the ROP of various kinds of cyclic esters or cyclic carbonates and for the transesterification of polymers containing carboxylic acid-esters or carbonic acid-esters. Examples are salen, salan, salalen, guanidinate, porphyrin, β-ketiminate, phenoxy-imine, phenoxy-amine, bisphenolate, trisphenolate, alkoxyamine, alkoxyether and alkoxythioether complexes of Mg, Ca, Sc, Y, lanthanides, Ti, Zr, Zn, Al, Ga, Bi and Sn.

Recently, several well-defined metallic initiators have been developed for the controlled, living ROP of the various isomers of LA, namely rac-, L-, D- and meso-LA, as disclosed for example in O'Keefe et al. (B. J. O'Keefe, M. A. Hillmyer, W. B. Tolman, *J. Chem. Soc., Dalton Trans.*, 2001, 2215-2224), or in Lou et al. (Lou, C. Detrembleur, R. Jérôme, *Macromol. Rapid. Commun.*, 2003, 24, 161-172), or in Nakano et al. (K. Nakano, N. Kosaka, T. Hiyama, K. Nozaki, *J. Chem. Soc., Dalton Trans.*, 2003, 4039-4050), or in Dechy-Cabaret et al. (O. Dechy-Cabaret, B. Martin-Vaca, D. Bourissou, *Chem. Rev.*, 2004, 104, 6147-6176), or in Wu et al. (Wu, T.-L Yu, C.-T. Chen, C.-C. Lin, *Coord. Chem. Rev.*, 2006, 250, 602-626), or in Amgoune et al. (Amgoune, C. M. Thomas, J.-F. Carpentier, *Pure Appl. Chem.* 2007, 79, 2013-2030). They are based mostly on: non-toxic zinc (M. Cheng, A. B. Attygalle, E. B. Lobkovsky, G. W. Coates, *J. Am. Chem. Soc.*, 1999, 121, 11583-11584; B. M. Chamberlain, M. Cheng, D. R. Moore, T. M. Ovitt, E. B. Lobkovsky, G. W. Coates, *J. Am. Chem. Soc.*, 2001, 123, 3229-3238; C. K. Williams, L. E. Breyfogle, S. K. Choi, W. Nam, V. G. Young Jr., M. A. Hillmyer, W. B. Tolman, *J. Am. Chem. Soc.*, 2003, 125, 11350-11359; G. Labourdette, D. J. Lee, B. O. Patrick, M. B. Ezhova, P. Mehrkhodavandi, *Organometallics*, 2009, 28, 1309-1319; Z. Zheng, G. Zhao, R. Fablet, M. Bouyahyi, C. M. Thomas, T. Roisnel, O. Casagrande Jr., J.-F. Carpentier, *New J. Chem.*, 2008, 32, 2279-2291), aluminum (N. Spassky, M. Wisniewski, C. Pluta, A. LeBorgne, *Macromol. Chem. Phys.*, 1996, 197, 2627-2637; T. M. Ovitt, G. W. Coates, *J. Am. Chem. Soc.*, 1999, 121, 4072-4073; M. Ovitt, G. W. Coates, *J. Am. Chem. Soc.*, 2002, 124, 1316-1326; N. Nomura, R. Ishii, Y. Yamamoto, T. Kondo, *Chem. Eur. J.*, 2007, 13, 4433-4451; H. Zhu, E. Y.-X. Chen, *Organometallics*, 2007, 26, 5395-5405), non-toxic bismuth H. Kricheldorf *Chem. Rev.* 2009, 109, 5579 or Group 3 metals and lanthanides (C.-X. Cai, A. Amgoune, C. W. Lehmann, J.-F. Carpentier, *Chem. Commun.*, 2004, 330-331; A. Amgoune, C. M. Thomas, T. Roisnel, J.-F. Carpentier, *Chem. Eur. J.*, 2006, 12, 169-179; A. Amgoune, C. M. Thomas, S. Ilinca, T. Roisnel, J.-F. Carpentier, *Angew. Chem. Int. Ed.*, 2006, 45, 2782-2784).

The amount of additional catalyst for step B) used is selected from a range of for example 0.0001 to 0.5% by weight, preferably 0.001 to 0.1% by weight based on the cyclic ester, or the number of carbonyl functionalities in the polymer added during step B).

After step B) is finished, the graft-copolymer is obtained. In an embodiment, the reaction mixture is quenched using a quenching agent, preferably a protic polar reagent, more preferably an alcohol, preferably methanol or ethanol. However, water can also be used. The product obtained after this quenching is a crude product which may contain also the polyolefin obtained in step A) and/or the polymer obtained from the ROP or nucleophilic substitution reaction in step B) that is not attached to the polyolefin main chain. For most applications, however, the crude product may be used as such without further purification.

If the polymer obtained from the ROP or nucleophilic substitution reaction in step B) has to be removed from the product, this crude product may for example be subjected to an additional step of work up. This work up step may comprise a precipitation. For example a precipitation in a solvent, such as THF or other organic solvents, such as chloroform. This can also be called an extraction in case the polymer for the side chains is polar because any polar homopolymer formed will be extracted out of the crude product leaving the graft copolymer and possibly homopolymer of the olefin.

A person skilled in the art will be able to determine the required steps in order to purify the copolymer products, using e.g. one or more precipitation and/or extraction steps using one or more solvents. The product may also be dried prior to use thereof.

Further Embodiments

The present invention relates to a two-step process for the preparation of graft copolymers.

Using the process according to the present invention, graft copolymers can be obtained. In an embodiment, the graft copolymer has an number average molecular weight ($M_n$) for example between 500 and 1,000,000 g/mol, preferably between 1,000 and 200,000 g/mol.

The polyolefin-based graft copolymers obtained after step B) of the present invention preferably have a polydispersity index ($Đ$) of between 1.1 and 10.0, more preferably between 1.1 and 5.0, more preferably between 1.1 and 4.0, even more preferably between 1.5 and 3.

The polyolefin main chain may be linear or branched (both long chain branched and short chain branched), atactic, isotactic or syndiotactic, preferably, isotactic polyolefins in the case of poly-α-olefins, wherein the isotactic polyolefin is preferably isotactic polypropylene.

According to a specific, non-limiting embodiment of the present invention, the polyolefin main chain may be linear low density polyethylene (LLDPE), high density polyethylene (HDPE), ethylene-propylene copolymer (EP), atactic, isotactic or syndiotactic PP (aPP, iPP, sPP, respectively), poly-4-methyl-1-pentene (P4M1P) or atactic, isotactic or syndiotactic polystyrene (aPS, iPS, sPS, respectively).

The graft copolymers according to the present invention may have a mass fraction of polyolefin (mfPol) of between 10% and 90%, preferably between 30% and 70%. The mass fraction mfPol is defined by the mass of the polyolefin divided by the total mass of the copolymer.

The graft copolymers according to the present invention may have a volume fraction of polymer for the side chains (vfPol) of between 90% and 10%, preferably between 70% and 30%. The volume fraction vfPol is defined by the volume of the polymer for the side chains divided by the total volume of the copolymer.

Examples of polymers having a polyolefin main chain and polar polymer side chains that can be prepared using the present method are HDPE-g-PCL, HDPE-g-PLA, HDPE-g-PBA, HDPE-g-PBS, HDPE-g-PEB, HDPE-g-poly(CL-co-PDL), HDPE-g-poly(BA-co-EB), HDPE-g-poly(BA-co-PDL), LLDPE-g-PCL, LLDPE-g-PLA, LLDPE-g-PBA, LLDPE-g-PBS, LLDPE-g-PEB, LLDPE-g-poly(BA-co-EB), LLDPE-g-poly(CL-co-PDL), LLDPE-g-poly(BA-co-PDL), EP-g-PCL, EP-g-PLA, EP-g-PBA, EP-g-PBS, EP-g-PEB, EP-g-poly(BA-co-EB), EP-g-poly(CL-co-PDL), EP-g-poly(BA-co-PDL), aPP-g-PCL, iPP-g-PLA, aPP-g-PBA, aPP-g-PBS, aPP-g-PEB, aPP-g-poly(BA-co-EB), aPP-g-poly(CL-co-PDL), aPP-g-poly(BA-co-PDL), iPP-g-PCL, iPP-g-PLA, iPP-g-PBA, iPP-g-PBS, iPP-g-PEB, iPP-g-poly(BA-co-EB), iPP-g-poly(CL-co-PDL), iPP-g-poly(BA-co-PDL), sPP-g-PCL, sPP-g-PLA, sPP-g-PBA, sPP-g-PBS, sPP-g-PEB, sPP-g-poly(BA-co-EB), sPP-g-poly(CL-co-PDL), sPP-g-poly(BA-co-PDL), iP4M1P-g-PCL, iP4M1P-g-PBA, iP4M1P-g-PBS, iP4M1P-g-PEB, iP4M1P-g-poly(BA-co-EB), iP4M1P-g-poly(CL-co-PDL), iP4M1P-g-poly(BA-co-PDL), aPS-g-PCL, aPS-g-PBA, aPS-g-PBS, aPS-g-PEB, aPS-g-poly(BA-co-EB), aPS-g-poly(CL-co-PDL), aPS-g-poly(BA-co-PDL), iPS-g-PCL, iPS-g-PBA, iPS-g-PBS, iPS-g-PEB, iPS-g-poly(BA-co-EB), iPS-g-poly(CL-co-PDL), iPS-g-poly(BA-co-PDL), sPS-g-PCL, sPS-g-PBA, sPS-g-PBS, sPS-g-PEBL, sPS-g-poly(BA-co-EB), sPS-g-poly(CL-co-PDL), sPS-g-poly(BA-co-PDL) and many other polymers.

Examples of polymers having a polyolefin main chain and polyethylene-like polymer side chains that can be prepared using the present method are HDPE-g-PPDL, HDPE-g-PAmb, HDPE-g-poly(PDL-co-Amb), LLDPE-g-PPDL, LLDPE-g-PAmb, LLDPE-g-poly(PDL-co-Amb), EP-g-PPDL, EP-g-PAmb, EP-g-poly(PDL-co-Amb), aPP-g-PPDL, aPP-g-PAmb, aPP-g-poly(PDL-co-Amb), iPP-g-PPDL, iPP-g-PAmb, iPP-g-poly(PDL-co-Amb), sPP-g-PPDL, sPP-g-PAmb, sPP-g-poly(PDL-co-Amb), iP4M1P-g-PPDL, iP4M1P-g-PAmb, iP4M1P-g-poly(PDL-co-Amb), aPS-g-PPDL, aPS-g-PAmb, aPS-g-poly(PDL-co-Amb), iPS-g-PPDL, iPS-g-PAmb, iPS-g-poly(PDL-co-Amb), sPS-g-PPDL, sPS-g-PAmb, sPS-g-poly(PDL-co-Amb).

Examples of polymers having a polyolefin main chain, and polyethylene-like and polar side chains that can be prepared using the present method are HDPE-g-PPDL-g-PCL, HDPE-g-PAmb-g-PCL, HDPE-poly(PDL-co-Amb)-g-PCL, LLDPE-g-PPDL-g-PCL, LLDPE-g-PAmb-g-PCL, LLDPE-poly(PDL-co-Amb)-g-PCL, EP-g-PPDL-g-PCL, EP-g-PAmb-g-PCL, EP-g-poly(PDL-co-Amb)-g-PCL, aPP-g-PPDL-g-PCL, aPP-g-PAmb-g-PCL, aPP-poly(PDL-co-Amb)-g-PCL, iPP-g-PPDL-g-PCL, iPP-g-PAmb-g-PCL, iPP-poly(PDL-co-Amb)-g-PCL, sPP-g-PPDL-g-PCL, sPP-g-PAmb-g-PCL, sPP-poly(PDL-co-Amb)-g-PCL, iP4M1P-g-PPDL-g-PCL, iP4M1P-g-PAMb-g-PCL, iP4M1P-g-poly(PDL-co-Amb)-g-PCL, aPS-g-PPDL-g-PCL, aPS-g-PAmb-g-PCL, aPS-poly(PDL-co-Amb)-g-PCL, iPS-g-PPDL-g-PCL, iPS-g-PAmb-g-PCL, iPS-poly(PDL-co-Amb)-g-PCL, sPS-g-PPDL-g-PCL, sPS-g-PAmb-g-PCL, sPS-poly(PDL-co-Amb)-g-PCL.

According to a specific, non-limiting embodiment of the present invention, the polyolefin main chain may be HDPE, LLDPE, EP, aPP, iPP, sPP, iP4M1P, aPS, iPS or sPS.

The copolymers prepared according to the present invention may for example be used to introduce polar properties to enhance the interfacial interactions in polyolefins blends with polar polymers or blends with different polyolefins with PEs. They may be used as compatibilizers to improve properties such as adhesion. They may be used to improve barrier properties, especially against oxygen, for polyolefin films. They may be used as compatibilizers to highly polar polymers such as starch or for polyolefin-based composites with inorganic fillers such as glass or talc. They may be used in drug delivery devices, nonporous materials/membranes.

Advantages of the Present Invention

An advantage of the present invention is the reduction of the number of process steps that are required towards the synthesis of copolymers. The process according to the present invention is less time, energy and material consuming than the processes according to the prior art.

Another advantage of the present invention is that in principle only one single catalyst is required during the entire process, being the metal catalyst or metal catalyst precursor in step A). The metal that is used to protect the functional group of the functional comonomer in step A) acts as the initiator and catalyst during step B).

The process according to the invention can be a so-called cascade or cascade-like process. Preferably, step B) can thereby be carried out directly after step A) and/or step C) can be carried out directly after step B), preferably for example in a series of connected reactors, preferably continuously. Such a process according to the present invention can thereby be carried out without a metal-substitution step, for example by hydrolysis. A metal-substitution step can thereby for example be any step removing the metal to give a reactive organic function. Preferably, the steps A), B) and C) are carried out in a so-called cascade-like process. In other words, the process can be a single multi-step process using a series of reactors for example without metal-substitution, for example by hydrolysis, without work-up, without drying and/or without purification steps. It should be noted that an extruder is also considered as a reactor in the context of the present invention. It should be noted that an extruder is also considered as a reactor in the context of the present invention.

The desired graft copolymer can be obtained in high yield thereby reducing considerably the number or process steps that are required according to prior art processes, such as intermediate work up, filtration, drying etc. This is an advantage of the present invention.

EXAMPLES

The invention is further illustrated by the following non-limiting examples merely used to further explain certain embodiments of the present invention.

All manipulations were performed under an inert dry nitrogen atmosphere using either standard Schlenk or glove box techniques. Dry, oxygen free toluene was employed as solvent for all polymerizations. rac-Me$_2$Si(Ind)$_2$ZrCl$_2$ (1) and rac-Me$_2$Si(2-Me-4-Ph-Ind)$_2$ZrCl$_2$ (2) were purchased from MCAT GmbH, Konstanz, Germany. [CsMe$_4$CH$_2$CH$_2$NMe$_2$]TiCl$_2$ (3) was prepared as disclosed in WO9319104. Methylaluminoxane (MAO, 30 wt. % solution in toluene) was purchased from Chemtura. Diethyl zinc (1.0 M solution in hexanes), tri(i-butyl) aluminum (1.0 M solution in hexanes), Tetrachloroethane-d$_2$ (TCE-d$_2$) and CL were purchased from Sigma Aldrich. 10-undecene-1-ol (C11OH) was purchased from Aldrich and dried with 4-A molecular sieves under an inert atmosphere.

Typical Polymerization Procedure

For the preparation of polyethylene-graft-polycaprolactone copolymers, a sequential feed process carried out in a single batch reactor was applied. The first step A) consists of ethylene/C11OH copolymerization followed by ROP (step B) of CL. Polymerization reactions were carried out in stainless steel Büchi reactors. Prior to the polymerization, the reactor was dried in vacuum at 40° C. and flushed with nitrogen. Toluene solvent (70 mL) was introduced followed by TIBA and the functional monomer under an inert atmosphere. The resulting solution was stirred for 15-20 min followed by the addition of a calculated amount of co-catalyst under nitrogen atmosphere. The polymerization reaction was started by addition of the metal catalyst precursor to reactor. The reactor was then pressurized to the desired pressure with ethylene and the pressure was maintained for a predefined time. The ethylene feed was stopped and the residual pressure was releasing. Through a liquid injection tube, the calculated amount of CL monomer was added under inert atmosphere and the suspension was maintained at 60° C. for predefined time under rigorous stirring (600 rpm). The reaction was terminated by precipitation in acidic methanol (10% concentrated hydrochloric acid) to isolate PE-graft-PCL copolymers and PCL materials.

Analytical Techniques $^1$H NMR analysis carried out at 80-110° C. using TCE-d$_2$ as the solvent and recorded in 5 mm tubes on a Varian Mercury spectrometer operating at frequencies of 400 MHz. Chemical shifts are reported in ppm versus tetramethylsilane and were determined by reference to the residual solvent.

Heteronuclear multiple-bond correlation spectra (HMBC) were recorded with pulse field gradients. The spectral windows for 1H and 13C axes were 6075.3 and 21367.4 Hz, respectively. The data were collected in a 2560×210 matrix and processed in a 1K×1K matrix. The spectra were recorded with the acquisition time 0.211 s, relaxation delay 1.4 s and number of scans equal to 144×210 increments.

Solid-state $^{13}$C{$^1$H} Cross-Polarization/Magic-Angle Spinning (CP/MAS) NMR and $^{13}$C{$^1$H} Insensitive Nuclei Enhanced by Polarization Transfer (INEPT) experiments were carried out on a Bruker AVANCE-III 500 spectrometer employing a double-resonance H-X probe for rotors with 2.5 mm outside diameter. These experiments utilized a MAS frequency of 25.0 kHz, a 2.5 µs π/2 pulse for $^1$H and $^{13}$C NMR, a CP contact time of 2.0 ms and TPPM decoupling during acquisition. The CP conditions were pre-optimized using L-alanine. The $^{13}$C{$^1$H} INEPT spectra were recorded using the refocused-INEPT sequence with a J-evolution period of either ⅓ J$_{CH}$ or ⅙ J$_{CH}$ assuming a $^1$J$_{CH}$ of 150 Hz, i.e. for a J-evolution time of ⅓ J$_{CH}$ the signals from CH and CH$_3$ groups are positive, while those of CH$_2$ are negative. The $^2$D $^1$H-$^1$H double quantum-single quantum (DQ-SQ) correlation experiments and DQ build-up experiments were carried out on a Bruker AVANCE-III 700 spectrometer using a 2.5 mm solid-state MAS double-resonance probe. These experiments employed a spinning frequency of 25.0 kHz. DQ excitation and reconversion was performed using the broadband back-to-back (BaBa) sequence. Chemical shifts for $^1$H and $^{13}$C NMR spectra are reported relative to TMS using solid adamantane as an external.

Size exclusion chromatography (SEC). The molecular weight (M$_n$ and M$_w$) in g/mol and the Ð were determined by means of high temperature size exclusion chromatography which was performed at 160° C. using a high speed GP C (Freeslate, Sunnyvale, USA). Detection: IR4 (PolymerChar, Valencia, Spain). Column set: three Polymer Laboratories 13 µm PLgel Olexis, 300×7.5 mm. 1,2,4-Trichlorobenzene (TCB) was used as eluent at a flow rate of 1 mL·min$^{-1}$. TCB was freshly distilled prior to use. The molecular weights and the corresponding Ð were calculated from HT SEC analysis with respect to narrow polyethylene standards (PSS, Mainz, Germany). HT SEC of copolymers was performed at 160° C. on a Polymer Lab oratories PLXT-20 Rapid GPC Polymer Analysis System (refractive index detector and viscosity detector) with 3 PLgel Olexis (300×7.5 mm, Polymer Laboratories) columns in series. TCB was used as eluent at a flow rate of 1 mL·min-1. The molecular weights (M$_n$ and M$_w$) were calculated with respect to polyethylene standards (Polymer Laboratories). A Polymer Laboratories PL XT-220 robotic sample handling system was used as autosampler.

Differential scanning calorimetry (DSC). Melting (T$_m$) and crystallization (T$_c$) temperatures as well as enthalpies of the transitions were measured by DSC using a DSC Q100 from TA Instruments. The measurements were carried out at a heating and cooling rate of 10° C.·min$^{-1}$ from −60° C. to 160° C. The transitions were deduce d from the second heating and cooling curves.

Examples 1 and 2

Step A) has been carried out using ethylene as the first type of olefin monomer, in-situ-protected C11OH as the second type of olefin monomer, 1 as the metal catalyst precursor. Moreover, TIBA and MAO are used. During step B) a ROP process has been carried out using CL as the cyclic monomer.

Examples 3 and 4

Step A) has been carried out using ethylene as the first type of olefin monomer, in-situ-protected C11OH as the second type of olefin monomer, 2 as the metal catalyst precursor. Moreover, TIBA and MAO are used. During step B) a ROP process has been carried out using CL as the cyclic monomer.

Examples 5 and 6

Step A) has been carried out using ethylene as the first type of olefin monomer, 3 as the metal catalyst precursor. Moreover, TIBA and MAO are used. During step B) a ROP process has been carried out using CL as the cyclic monomer.

Examples 7 and 8

Step A) has been carried out using ethylene as the first type of olefin monomer, in-situ-protected C11OH as the second type of olefin monomer, 1 as the metal catalyst precursor. Moreover, TIBA, MAO and BHT are used. During step B) a ROP process has been carried out using CL as the cyclic monomer.

TABLE 1

| Ex. | Cat.[a] 1 | 2 | 3 | MAO[b] | Molar ratio[c] | C2[d] | CL[e] | Yield[f] Crude | Yield in THF[g] | $M_n$ $(Đ)^{[h]}$ |
|---|---|---|---|---|---|---|---|---|---|---|
| 1 | 10 | — | — | 1000 | 500/150/1 | 3.0 (15) | 35 (60) | 2.6 | — | 9,400 (2.3) |
| 2 | 10 | — | — | 1000 | 500/150/1 | 3.0 (30) | 35 (60) | 5.5 | — | 10,200 (3.5) |
| 3 | — | 10 | — | 1000 | 500/150/1 | 3.0 (15) | 35 (60) | 3.2 | — | 7,600 (3.3) |
| 4 | — | 10 | — | 1000 | 500/150/1 | 3.0 (30) | 35 (60) | 5.3 | — | 10,300 (3.5) |
| 5 | — | — | 10 | 1000 | 500/250/1 | 3.0 (15) | 35 (60) | 6.1 | — | 6,100 (4.3) |
| 6 | — | — | 10 | 1000 | 500/250/1 | 3.0 (30) | 35 (60) | 9.9 | — | 8,200 (4.4) |
| 7 | 10 | — | — | 1000 | 500/150/1 | 3.0 (15) | 35 (60) | 10.5 | 5.2 | — |
| 8 | 10 | — | — | 1000 | 500/75/1 | 3.0 (30) | 35 (60) | 11.6 | 8.5 | — |

[a]metal catalyst precursors in μmol: rac-Me$_2$Si(Ind)$_2$ZrCl$_2$ (1); rac-Me$_2$Si(2-Me-4-Ph-Ind)$_2$ZrCl$_2$ (2); Ti: [C$_5$Me$_4$CH$_2$CH$_2$NMe$_2$]TiCl$_2$ (3).
[b]MAO co-catalyst in mmol (M)
[c]molar ratio of TIBA:C11OH:catalyst; wherein TIBA is used as chain transfer agent; wherein C11OH is the in-situ-protected 10-undecen-1-ol used as comonomer;
[d]C2: the ethylene pressure in bar and between brackets the reaction time in minutes;
[e]The value cited is the amount in mmol. The value between brackets is the time in minutes;
[f]Yield crude is the yield after precipitation in acidified methanol in grams. This may include mixtures of the desired graft copolymer with one or more homopolymers;
[g]yield in THF is the yield after a precipitation in THF in order to remove any PCL homopolymer, which is soluble in THF;
[h]$M_n$ is the number average molecular weight in g/mol and the value between brackets is the polydispersity index.

From Table 1, the following can be observed. A graft polymer product can be obtained using the method according to the present invention with several different types of catalyst for step A).

Example 9

Step A) has been carried out using propylene as the first type of olefin monomer, in-situ-protected C11OH as the second type of olefin monomer, 1 as the metal catalyst precursor. Moreover, TIBA and MAO are used. During step B) a ROP process has been carried out using CL as the cyclic monomer.

Example 10

Step A) has been carried out using propylene as the first type of olefin monomer, in-situ-protected C11OH as the second type of olefin monomer, 1 as the metal catalyst precursor. Moreover, TIBA and trityl tetrakis(pentafluorophenyl)borate are used. During step B) a ROP process has been carried out using CL as the cyclic monomer.

Example 11

Step A) has been carried out using propylene as the first type of olefin monomer, in-situ-protected C11OH as the second type of olefin monomer, 2 as the metal catalyst precursor. Moreover, TIBA and MAO are used. During step B) a ROP process has been carried out using CL as the cyclic ester monomer.

Example 12

Step A) has been carried out using propylene as the first type of olefin monomer, in-situ-protected C11OH as the second type of olefin monomer, 2 as the metal catalyst precursor. Moreover, TIBA and trityl tetrakis(pentafluorophenyl)borate are used. During step B) a ROP process has been carried out using CL as the cyclic ester monomer.

TABLE 2

| Ex. | Cat.[a] 1 | 2 | borate:cat | MAO[b] | Molar ratio[c] | C3[d] | CL[e] | Yield[f] Crude | Yield in THF | $M_n$ $(Đ)^{[g]}$ |
|---|---|---|---|---|---|---|---|---|---|---|
| 9 | 10 | — | 0 | 1000 | 500/250/1 | 3.0 (15) | 35 (60) | 28.2 | 12.3 | |
| 10 | 10 | — | 1.5 | 0 | 500/250/1 | 3.0 (30) | 35 (60) | 7.3 | 5.6 | |
| 11 | — | 10 | 0 | 1000 | 500/250/1 | 3.0 (15) | 35 (60) | 18.3 | 11.3 | |

TABLE 2-continued

| Ex. | Cat.[a] 1 | Cat.[a] 2 | borate:cat | MAO[b] | Molar ratio[c] | C3[d] | CL[e] | Yield[f] Crude | Yield in THF | $M_n$ $(Ð)$[g] |
|---|---|---|---|---|---|---|---|---|---|---|
| 12 | — | 10 | 1.5 | 0 | 500/250/1 | 3.0 (15) | 35 (60) | 6.9 | 4.3 | |

[a] metal catalyst precursors in μmol: rac-Me₂Si(Ind)₂ZrCl₂ (1); rac-Me₂Si(2-Me-4-Ph-Ind)₂ZrCl₂ (2);
[b] MAO co-catalyst in mmol (M)
[c] molar ratio of TIBA:C11OH:catalyst; wherein TIBA is used as chain transfer agent; wherein C11OH is the in-situ-protected 10-undecen-1-ol used as comonomer;
[d] C3: the propylene pressure in bar and between brackets the reaction time in minutes;
[e] The value cited is the amount in mmol. The value between brackets is the time in minutes;
[f] Yield crude is the yield after precipitation in acidified methanol in grams. This may include mixtures of the desired graft copolymer with one or more homopolymers;
[g] yield in THF is the yield after a precipitation in THF in order to remove any PCL homopolymer, which is soluble in THF;
[h] $M_n$ is the number average molecular weight in g/mol and the value between brackets is the polydispersity index.

From the above, the following can be observed. With the method according to the present method a variety of graft copolymers can be obtained by tuning the polyolefin main chain and by tuning the monomer used in the preparation of the polymer side chains. Moreover, several catalyst may be used to prepare the side chain branches.

The invention claimed is:

1. A process for the preparation of a graft copolymer comprising a polyolefin main chain and one or multiple polymer side chains, the process comprising the steps of:
   A) copolymerizing a first type of olefin monomer and a second type of metal-pacified functionalized olefin monomer using a catalyst system to obtain a polyolefin main chain having a metal-pacified functionalized chain branch, the catalyst system comprising:
      i) a metal catalyst or metal catalyst precursor comprising a metal from Group 3-10 of the IUPAC Periodic Table of elements; and
      ii) optionally a co-catalyst;
   B) forming a polymer side chain on the polyolefin main chain, wherein as catalytic initiators the metal-pacified functionalized chain branch on the polyolefin main chain obtained in step A) is used to obtain the graft copolymer,
   wherein step B) of obtaining the graft copolymer is carried out by a combination of ROP using a type of cyclic monomer and a nucleophilic substitution reaction at a carbonyl group-containing functionality of a second polymer.

2. The process according to claim 1, wherein the process is a single process using a series of reactors.

3. The process according to claim 1, wherein the first type of olefin monomer is a compound according to Formula I-A:

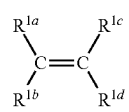

Formula I-A wherein C is carbon and wherein $R^{1a}$, $R^{1b}$, $R^{1c}$, and $R^{1d}$ are each independently selected from the group consisting of H or hydrocarbyl with 1 to 16 carbon atoms.

4. The process according to claim 1, wherein the second type of metal-pacified functionalized olefin monomer is a compound according to Formula I-B:

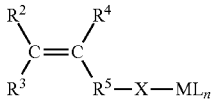

Formula I-B wherein C is carbon;
wherein $R^2$, $R^3$, and $R^4$ are each independently selected from the group consisting of H or hydrocarbyl with 1 to 16 carbon atoms, and
wherein $R^5$—X-$ML_n$ is a main group metal pacified heteroatom-containing functional group, wherein X is a heteroatom or a heteroatom-containing group, M is a metal, L is a ligand, and n is 0 to 3, wherein the heteroatom that is bonded to M is selected from the group consisting of O, S and N; wherein $R^5$ is a hydrocarbyl with 1 to 16 carbon atoms.

5. The process according to claim 1, wherein during step B) no additional catalyst for the ROP, transesterification or nucleophilic substitution reaction is added.

6. The process according to claim 1, wherein the metal catalyst or metal catalyst precursor used in step A) comprises a metal from Group 3-8 of the IUPAC Periodic Table of elements and/or wherein the metal catalyst or metal catalyst precursor used in step A) comprises a metal selected from the group consisting of Ti, Zr, Hf, V, Cr, Fe, Co, Ni, and Pd.

7. The process according to claim 1, comprising the co-catalyst and wherein the co-catalyst is selected from the group consisting of MAO, DMAO, MMAO, SMAO, fluorinated aryl borane or fluorinated aryl borate.

8. The process according to claim 1, wherein the olefin monomer according to Formula I-A is selected from the group consisting of ethylene, propylene, 1-butene, 4-methyl-1-pentene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-cyclopentene, cyclohexene, norbornene, ethylidene-norbornene, and vinylidene-norbornene and one or more combinations thereof.

9. The process according to claim 1, wherein the cyclic monomer used during ROP in step B) is a polar monomer, selected from the group consisting of a lactone, a lactide, a cyclic oligoester, an epoxide, an aziridine, a combination of epoxide and/or aziridine and $CO_2$, a cyclic anhydride, a combination of epoxide and/or aziridine and a cyclic anhydride, a combination of epoxide and/or aziridine and $CO_2$ and a cyclic anhydride, a cyclic N-carboxyanhydride, a cyclic carbonate, a lactam and one or more combinations thereof, or wherein the cyclic monomer used during ROP in step B) is a nonpolar cyclic monomer having a ring size of at least 12 atoms.

10. The process according to claim 1, wherein the polymer added during step B) to form the side chains comprising a carboxylic or carbonic acid ester functionality or a carbonyl group-containing functionality is selected from the group consisting of a polyester, a polycarbonate, a polyamide, a polyurethane, a polyurea, a random or block poly(carbonate-ester), poly(carbonate-ether), poly(ester-ether), poly(carbonate-ether-ester), poly(ester-amide), poly(ester-ether-amide), poly(carbonate-amide), poly(carbonate-ether-amide), poly(ester-urethane), poly(ester-ether-urethane), poly(carbonate-urethane), poly(carbonate-ether-urethane), poly(ester-urea), poly(ester-ether-urea), poly(carbonate-urea), poly(carbonate-ether-urea), poly(ether-amide), poly(amide-urethane), poly(amide-urea), poly(urethane-urea) or one or more combination thereof.

11. The process according to claim 1, wherein the pacifying metal used to obtain the metal-pacified functionalized olefin monomer is selected from the group consisting of: aluminum, titanium, zinc, gallium, magnesium, calcium and one or more combinations thereof.

12. The process according to claim 9, wherein the cyclic monomer used during ROP in step B) is a nonpolar cyclic monomer having a ring size of at least 12 atoms, selected from the group consisting of cyclic esters, cyclic carbonates, cyclic amides, cyclic urethanes and cyclic ureas; or one or more combinations thereof.

13. The process according to claim 1, wherein the metal-pacified functionalized olefin monomer is prepared before the catalyst system is added.

14. The process according to claim 1, wherein the metal-pacified functionalized olefin monomer is prepared by a deprotonation reaction between a protic functionalized olefin monomer according to Formula I-C below and a metal pacifying agent:

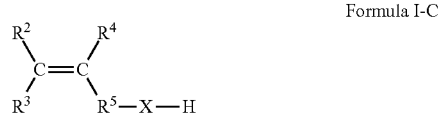

Formula I-C wherein, $R^2$, $R^3$, and $R^4$ are each independently selected from the group consisting of H or hydrocarbyl with 1 to 16 carbon atoms; wherein X is a heteroatom or a heteroatom-containing group, wherein the heteroatom is selected from the group consisting of O, S and N; and wherein $R^5$ is a hydrocarbyl with 1 to 16 carbon atoms.

15. The process according to claim 14, wherein the metal pacifying agent has a structure of $L_n MR^{7c}_p$, wherein L is a ligand, M is a metal, $R^{7c}$ is a hydride or hydrocarbyl with 1 to 16 carbon atoms, n is 0 to 3, and p is 1, 2 or 3.

* * * * *